(12) United States Patent
Ozawa et al.

(10) Patent No.: US 11,876,256 B2
(45) Date of Patent: Jan. 16, 2024

(54) FUEL CELL SYSTEM AND CONTROL METHOD THEREFOR

(71) Applicant: MITSUBISHI HEAVY INDUSTRIES, LTD., Tokyo (JP)

(72) Inventors: Hiroyuki Ozawa, Kanagawa (JP); Yasushi Iwai, Tokyo (JP); Kimi Kodo, Kanagawa (JP); Kenta Araki, Kanagawa (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 17/635,803

(22) PCT Filed: Jan. 27, 2021

(86) PCT No.: PCT/JP2021/002838
§ 371 (c)(1),
(2) Date: Feb. 16, 2022

(87) PCT Pub. No.: WO2021/171882
PCT Pub. Date: Sep. 2, 2021

(65) Prior Publication Data
US 2022/0376275 A1 Nov. 24, 2022

(30) Foreign Application Priority Data
Feb. 27, 2020 (JP) ................. 2020-032259

(51) Int. Cl.
*H01M 8/04014* (2016.01)
*H01M 8/04007* (2016.01)
(Continued)

(52) U.S. Cl.
CPC ... *H01M 8/04022* (2013.01); *H01M 8/04014* (2013.01); *H01M 8/0432* (2013.01);
(Continued)

(58) Field of Classification Search
CPC ......... H01M 8/04022; H01M 8/04074; H01M 8/04111; H01M 8/04201; H01M 8/0432; H01M 8/04753
See application file for complete search history.

(56) References Cited

U.S. PATENT DOCUMENTS

2009/0087298 A1    4/2009  Shibata
2012/0121376 A1*   5/2012  Huis In Het Veld ....................
                                                    F04D 27/0261
                                                         415/17

FOREIGN PATENT DOCUMENTS

JP          59-102945         7/1984
JP       2001015134 A  *     1/2001
(Continued)

OTHER PUBLICATIONS

Machine Translation of JP-2001015134-A (Apr. 7, 2023) (Year: 2023).*

(Continued)

*Primary Examiner* — Matthew J Merkling
(74) *Attorney, Agent, or Firm* — Wenderoth, Lind & Ponack, L.L.P.

(57) ABSTRACT

The purpose of the present invention is to provide: fuel cell system that can further stabilize an operation of the system; and control method thereof. Fuel cell system comprises: fuel cell; a turbocharger; oxidizing gas supply line that supplies, to cathode, oxidizing gas compressed by a compressor; a heat exchanger that heats the oxidizing gas of the oxidizing gas supply line by means of exhaust gas discharged from a turbine, and flows the exhaust gas to combustion exhaust gas line; bypass lines each having one end connected to the upstream side of the heat exchanger in the oxidizing gas supply line and bypassing the oxidizing gas; flow rate regulating valves provided in the bypass lines; and a control (Continued)

unit that controls the flow rate regulating valves on the basis of the ambient air temperature, and controls the bypass flow rate of the oxidizing gas.

8 Claims, 11 Drawing Sheets

(51) Int. Cl.
H01M 8/04111 (2016.01)
H01M 8/04082 (2016.01)
H01M 8/0432 (2016.01)
H01M 8/04746 (2016.01)

(52) U.S. Cl.
CPC .... *H01M 8/04074* (2013.01); *H01M 8/04111* (2013.01); *H01M 8/04201* (2013.01); *H01M 8/04753* (2013.01)

(56) References Cited

FOREIGN PATENT DOCUMENTS

| JP | 2005-344638 | 12/2005 |
| JP | 2009-85044 | 4/2009 |
| JP | 2009-205932 | 9/2009 |
| JP | 2010-196617 | 9/2010 |
| JP | 2013-235711 | 11/2013 |
| JP | 2018-6005 | 1/2018 |
| JP | 6591112 | 10/2019 |

OTHER PUBLICATIONS

International Search Report dated Apr. 27, 2021 in corresponding International Application No. PCT/JP2021/002838.

\* cited by examiner

FUEL CELL SYSTEM AND CONTROL METHOD THEREFOR

TECHNICAL FIELD

The present disclosure relates to fuel cell system and control method therefor.

BACKGROUND ART

Fuel cell that generates power by chemically reacting fuel gas with oxidizing gas has characteristics such as excellent power generation efficiency and environmental friendliness. Among fuel cells, solid oxide fuel cell (hereinafter, referred to as SOFC) generates power by using ceramics such as zirconia ceramics as an electrolyte, supplying hydrogen, town gas, natural gas, petroleum, methanol, and gas such as gasified gas produced from carbonaceous raw materials by a gasification facility, as fuel gas, and reacting in high temperature atmosphere of approximately 700° C. to 1000° C. (For example, PTL 1)

CITATION LIST

Patent Literature

[PTL 1] Japanese Patent No. 6591112

SUMMARY OF INVENTION

Technical Problem

In system using SOFC, there is case that oxidizing gas is compressed by a compressor of a turbocharger and is supplied to the SOFC, and combustion gas (exhaust gas) obtained by combusting a part of the exhaust oxidizing gas and the exhaust fuel gas discharged from the SOFC is supplied to the turbine of the turbocharger to drive the compressor. At this time, there is possibility that the operating state of the turbocharger becomes unstable because of increase or decrease in ambient air temperature. For example, when the ambient air temperature is low, the mass flow rate of the air supplied from the compressor increases, and accordingly, the mass flow rate of the combustion gas (exhaust gas) supplied to the turbine increases, and there is possibility that it results in choke state, the pressure on upstream side of the turbine increases, and the combustion gas exhaust pressure loss of the turbine becomes excessive. For example, when the ambient air temperature is high, there is possibility that the temperature of the air supplied to the fuel cell also increases and the output decreases, or it is not possible to supply sufficient air flow rate to operate the fuel cell at high output, and it makes the operation derate the output, and the fuel cell output cannot be maintained at rated value. Therefore, as control method from the operation of the turbocharger itself, in case the mass flow rate of the air supplied from the compressor increases because of the low ambient air temperature, there is possibility that the increased air at turbine inlet is released to the outside of the system. Further, in case the turbine inlet temperature increases because of the high ambient air temperature, there is possibility that low temperature gas is mixed in at the turbine inlet or is cooled by a heat exchanger. In power generation system using the SOFC, there is possibility that the mass flow rate or the gas temperature of the combustion gas at the turbine inlet affects the energy balance of the entire power generation system and the performance of the power generation system decreases, and thus, simple and stable control is desired with little effect on the performance of the power generation system.

The present disclosure has been made in view of such circumstances, and the object of the present disclosure is to provide fuel cell system capable of further stabilizing the operation of the system and control method therefor.

Solution to Problem

According to first aspect of the present disclosure, there is provided fuel cell system including: fuel cell having cathode (air electrode) and anode (fuel electrode); a turbocharger having a turbine to which exhaust fuel gas and exhaust oxidizing gas discharged from the fuel cell are supplied as combustion gas and having a compressor driven by the turbine; oxidizing gas supply line for supplying oxidizing gas compressed by the compressor to the cathode; a heat exchanger that heats the oxidizing gas in the oxidizing gas supply line by exhaust gas discharged from the turbine and that flows the exhaust gas to combustion exhaust gas line; bypass line having one end connected to upstream side of the heat exchanger in the oxidizing gas supply line and bypassing the oxidizing gas; a flow regulation valve provided on the bypass line; and a control unit that controls the flow regulation valve based on the ambient air temperature to control bypass flow rate of the oxidizing gas.

According to second aspect of the present disclosure, there is provided control method for fuel cell system including fuel cell having cathode and anode, a turbocharger having a turbine to which exhaust fuel gas and exhaust oxidizing gas discharged from the fuel cell are supplied as combustion gas and having a compressor driven by the turbine, oxidizing gas supply line for supplying oxidizing gas compressed by the compressor to the cathode, a heat exchanger that heats the oxidizing gas in the oxidizing gas supply line by exhaust gas discharged from the turbine and that flows the exhaust gas to combustion exhaust gas line, bypass line having one end connected to upstream side of the heat exchanger in the oxidizing gas supply line and bypassing the oxidizing gas, and a flow regulation valve provided on the bypass line, the method including: controlling the flow regulation valve based on ambient air temperature to control bypass flow rate of the oxidizing gas.

Advantageous Effects of Invention

According to the present disclosure, there is an effect that the operation of the system can be further stabilized.

DESCRIPTION OF EMBODIMENTS

Hereinafter, the first embodiment of the fuel cell system and the control method therefor according to the present disclosure will be described with reference to the drawings.

In the following, for convenience of description, the positional relationship between each of the configuration elements described using the expressions "up" and "down" on the paper surface indicates perpendicularly upper side and perpendicularly lower side, respectively, and perpendicular direction is not exact and includes uncertainty. In the present embodiment, regarding up-down direction and horizontal direction which can obtain the same effect, for example, the up-down direction on the paper surface is not necessarily limited to the perpendicularly up-down direction, and the direction may correspond to the horizontal direction orthogonal to the perpendicular direction.

Hereinafter, although a cylindrical (tubular) cell stack will be described as an example of a cell stack of solid oxide fuel cell (SOFC), the cell stack is not necessarily limited thereto, and may be, for example, a flat cell stack. The fuel cell is formed on a substrate, but electrode (anode (fuel electrode) 109 or cathode (air electrode) 113) may be formed thick without the substrate, and may also serve as the support part.

Figure 1:
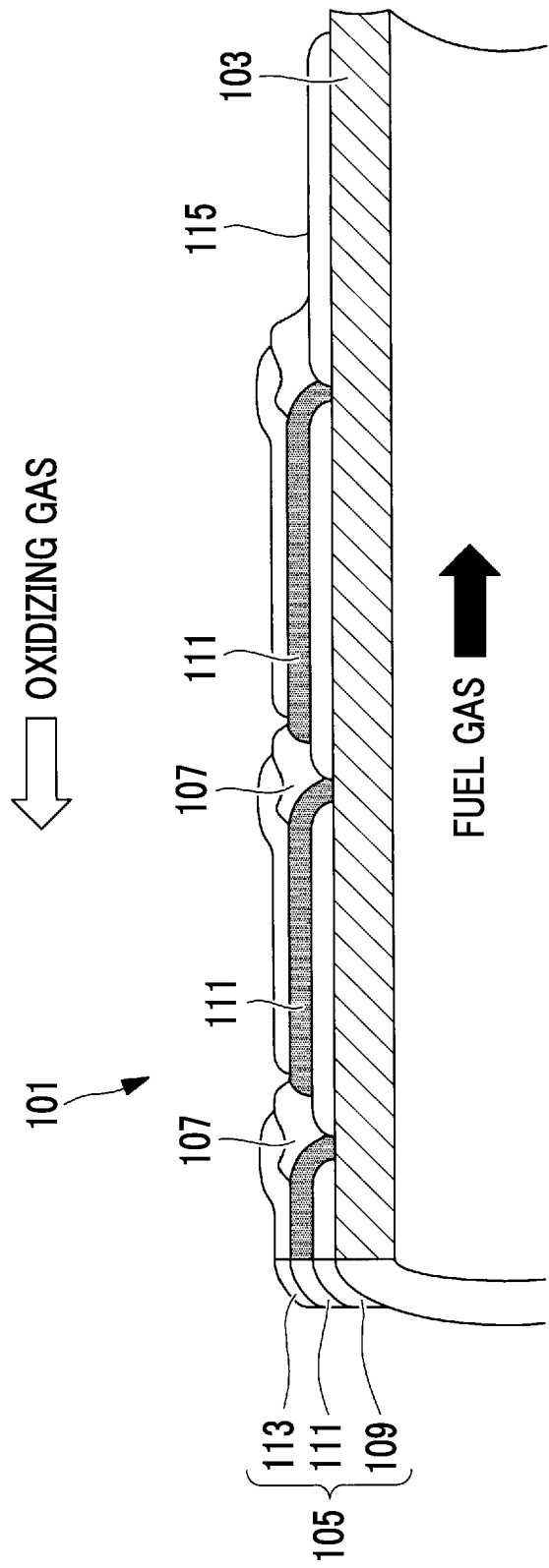
FIG. 1 shows example of a cell stack according to first embodiment of the present disclosure.

First, a cylindrical cell stack using a substrate tube will be described as example according to the present embodiment with reference to FIG. 1. When the substrate tube is not used, for example, the anode 109 may be formed thick and may also be used as the substrate tube, and the use of the substrate tube is not limited. The substrate tube in the present embodiment will be described using cylindrical shape, but the substrate tube may be tubular, and the cross section thereof is not necessarily limited to circular shape, and may be, for example, elliptical shape. A cell stack having flat tubular shape or the like in which peripheral side surface of the cylinder is vertically transposed may be used. Here, FIG. 1 illustrates the aspect of the cell stack according to the present embodiment. A cell stack 101 includes, for example, a cylindrical substrate tube 103, plurality of fuel cells 105 formed on an outer peripheral surface of the substrate tube 103, and an interconnector 107 formed between the fuel cells 105 adjacent to each other. The fuel cell 105 is formed by laminating anode 109, solid electrolyte film 111, and cathode 113. The cell stack 101 includes lead film 115 electrically connected via the interconnector 107 to the cathode 113 of the fuel cell 105 formed at one end at the endmost part of the substrate tube 103 in axial direction, and lead film 115 electrically connected to the anode 109 of the fuel cell 105 formed at the other end at the endmost part, in the plurality of fuel cells 105 formed on the outer peripheral surface of the substrate tube 103.

The substrate tube 103 is made of porous material, for example, CaO stabilized $ZrO_2$ (CSZ), a mixture of CSZ and nickel oxide (NiO), $Y_2O_3$ stabilized $ZrO_2$ (YSZ), $MgAl_2O_4$, or the like as main components. The substrate tube 103 supports the fuel cell 105, the interconnector 107, and the lead film 115, and diffuses the fuel gas supplied to the inner peripheral surface of the substrate tube 103 to the anode 109 formed on the outer peripheral surface of the substrate tube 103 through pores of the substrate tube 103.

The anode 109 is made of a of composite material of Ni and zirconia-based electrolyte material, and, for example, Ni/YSZ is used. The thickness of the anode 109 is 50 μm to 250 μm, and the anode 109 may be formed by screen-printing slurry. In this case, the anode 109 has Ni which is a component of the anode 109 and which has a catalytic action on the fuel gas. The catalytic reaction is performed for the fuel gas, for example, mixed gas of methane ($CH_4$) and steam, supplied through the substrate tube 103, and reformed to hydrogen ($H_2$) and carbon monoxide (CO). The anode 109 electrochemically reacts reformed gas which obtains hydrogen ($H_2$) and carbon monoxide (CO) with oxygen ions ($O^{2-}$) supplied through the solid electrolyte film 111, in the vicinity of interface with the solid electrolyte film 111, and generates water ($H_2O$) and carbon dioxide ($CO_2$). At this time, the fuel cell 105 generates power via electrons released from oxygen ions.

Examples of the fuel gas that can be supplied to the anode 109 of the solid oxide fuel cell and used, include gasified gas produced by gasification facility from carbonaceous raw material such as petroleum, methanol, and coal, in addition to hydrogen ($H_2$), carbon monoxide (CO), and hydrocarbon gas such as methane ($CH_4$), town gas, and natural gas.

As the solid electrolyte film 111, YSZ having airtightness that makes it difficult for gas to pass and high oxygen ionic conductivity at high temperature is mainly used. The solid electrolyte film 111 transfers oxygen ions ($O^{2-}$) generated at the cathode 113 to the anode 109. The film thickness of the solid electrolyte film 111 positioned on the surface of the anode 109 is 10 μm to 100 μm, and the solid electrolyte film 111 may be formed by screen-printing slurry.

The cathode 113 is made of, for example, a $LaSrMnO_3$-based oxide or a $LaCoO_3$-based oxide, and the cathode 113 is coated with slurry by screen-printing or using a dispenser. The cathode 113 dissociates oxygen in the oxidizing gas such as air to be supplied in the vicinity of the interface with the solid electrolyte film 111 and generates oxygen ions ($O^{2-}$).

The cathode 113 can also have a two-layer configuration. In this case, the cathode layer (cathode intermediate layer) on the solid electrolyte film 111 side is made of material having high ionic conductivity and excellent catalytic activity. The cathode layer (cathode conductive layer) on the cathode intermediate layer may be made of a perovskite type oxide represented by Sr and Ca— doped $LaMnO_3$. In this way, it is possible to further improve the power generation performance.

The oxidizing gas is gas containing approximately 15% to 30% oxygen, and representatively, air is suitable. However, in addition to air, mixed gas of combustion exhaust gas and air, mixed gas of oxygen and air, and the like can be used.

The interconnector 107 is made of a conductive perovskite type oxide represented by $M_{1-x}L_xTiO_3$ (M is alkaline earth metal element and L is lanthanoid element) such as $SrTiO_3$, and is formed by screen-printing slurry. The interconnector 107 is dense film such that the fuel gas and the oxidizing gas do not mix with each other. The interconnector 107 has stable durability and electric conductivity under both oxidizing atmosphere and reducing atmosphere. The interconnector 107 electrically connects the cathode 113 of one fuel cell 105 and the anode 109 of the other fuel cell 105 in the fuel cells 105 adjacent to each other, and connects the fuel cells 105 adjacent to each other in series.

Since the lead film 115 needs to have electron conductivity and to have a similar thermal expansion coefficient to that of other materials constituting the cell stack 101, the lead film 115 is made of composite material of Ni and zirconia-based electrolyte material such as Ni/YSZ or $M_{1-x}L_xTiO_3$ (M is alkaline earth metal element and L is lanthanoid element) such as $SrTiO_3$. The lead film 115 conducts DC power generated by the plurality of fuel cells 105 connected to each other in series by the interconnector 107, to the vicinity of end portion of the cell stack 101.

The substrate tube 103 on which the slurry film of the anode 109, the solid electrolyte film 111, and the interconnector 107 is formed is co-sintered in the atmosphere. The sintering temperature is specifically set at 1350° C. to 1450° C.

Next, the substrate tube 103 on which the slurry film of the cathode 113 is formed is sintered in the atmosphere on the co-sintered substrate tube 103. The sintering temperature is specifically set at 1100° C. to 1250° C. The sintering temperature here is lower than the co-sintering temperature after forming the substrate tube 103 to the interconnector 107.

Figure 2:
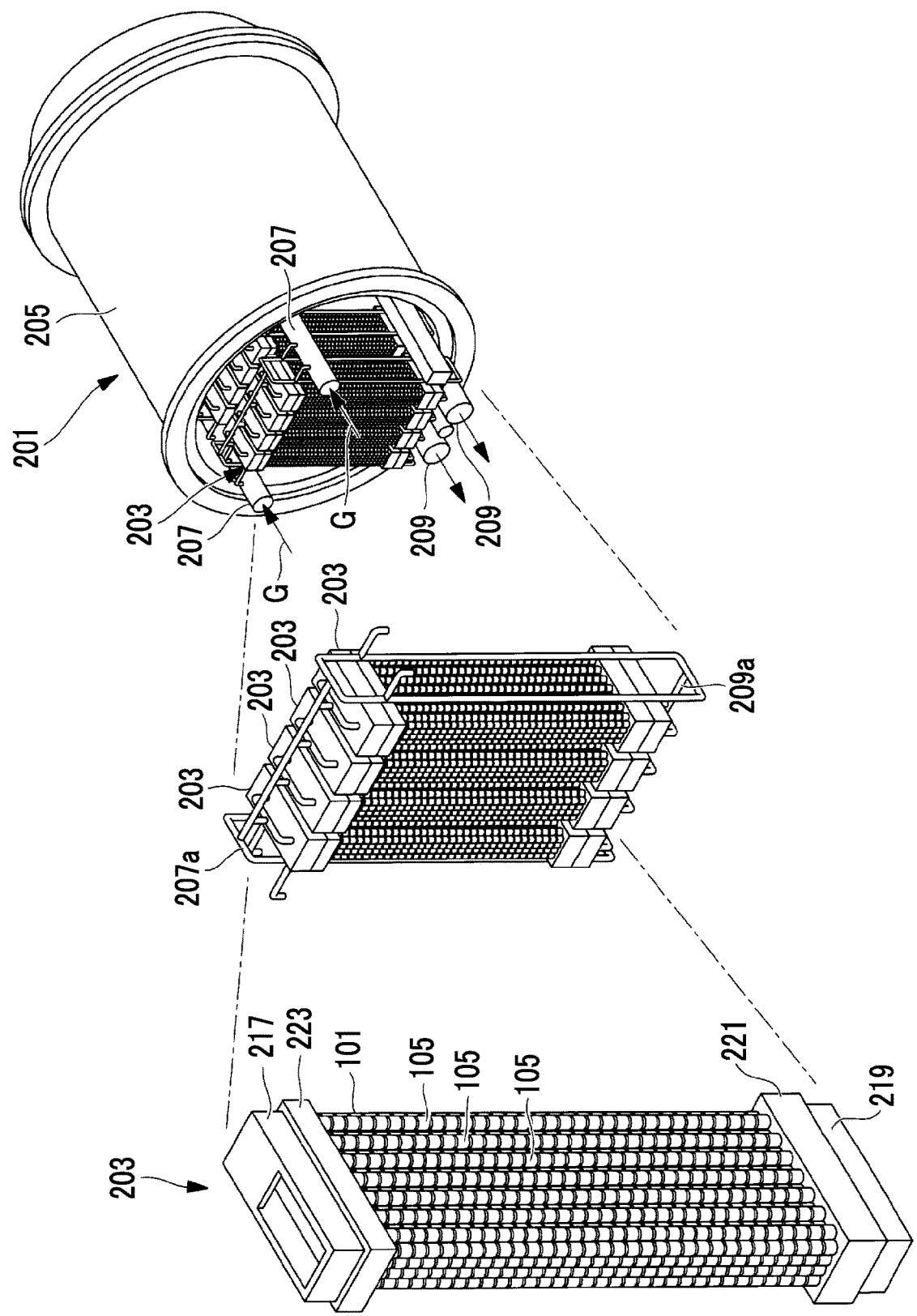
FIG. 2 shows example of an SOFC module according to the first embodiment of the present disclosure.
Figure 3:
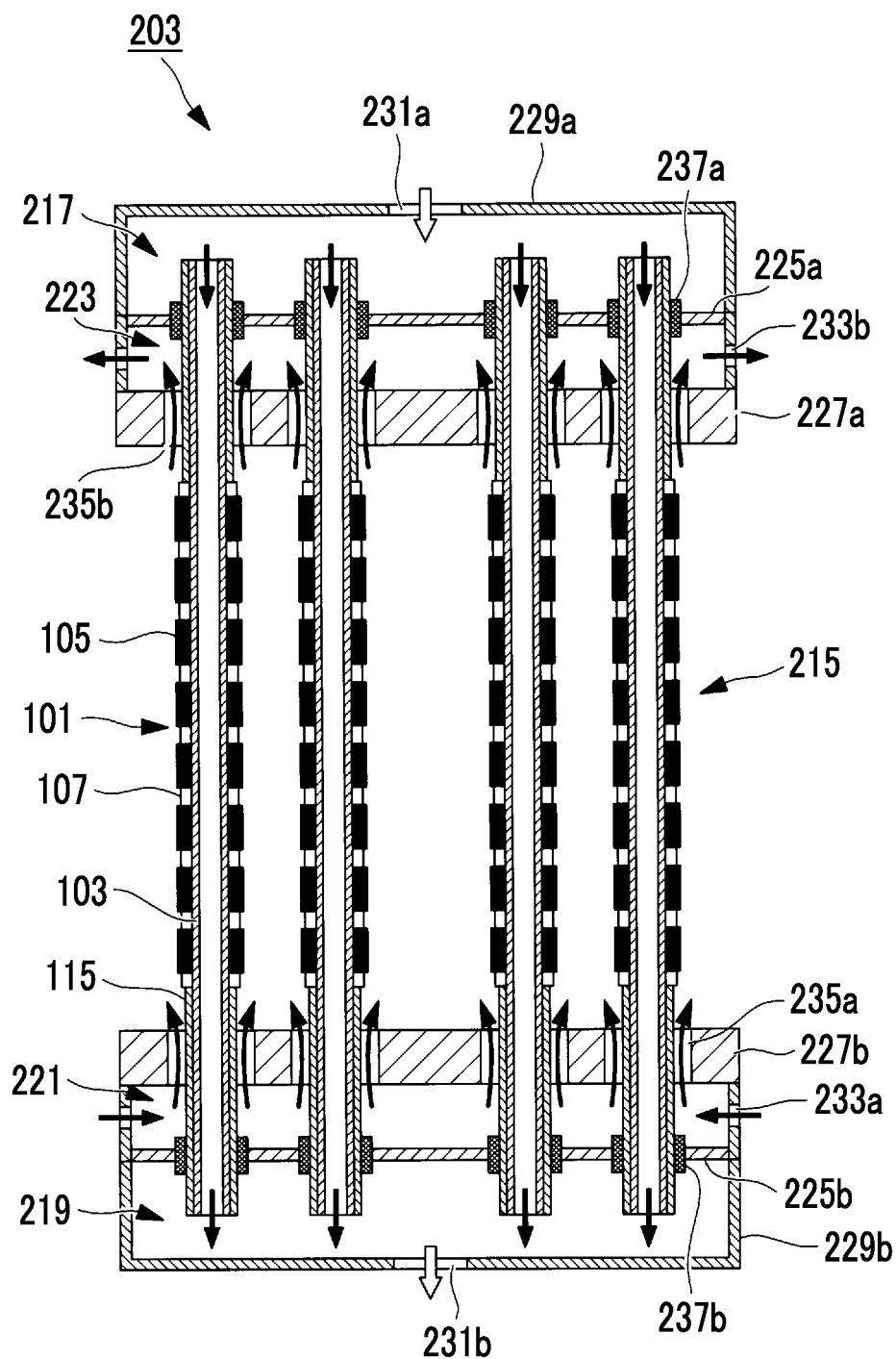
FIG. 3 shows example of an SOFC cartridge according to the first embodiment of the present disclosure.

Next, an SOFC module and an SOFC cartridge according to the present embodiment will be described with reference to FIGS. 2 and 3. Here, FIG. 2 illustrates aspect of the SOFC module according to the present embodiment. FIG. 3 illustrates a sectional view of aspect of the SOFC cartridge according to the present embodiment.

As illustrated in FIG. 2, an SOFC module (fuel cell module) 201 includes, for example, a plurality of SOFC cartridges 203 (fuel cell cartridges) and a pressure vessel 205 that stores the plurality of SOFC cartridges 203 therein. Although a cylindrical SOFC cell stack 101 is described as example in FIG. 2, the cell stack is not limited thereto, and may be, for example, a flat cell stack. The SOFC module 201 includes a fuel gas supply pipe 207, a plurality of fuel gas supply branch pipes 207a, a fuel gas discharge pipe 209, and a plurality of fuel gas discharge branch pipes 209a. The SOFC module 201 includes an oxidizing gas supply pipe (not illustrated), an oxidizing gas supply branch pipe (not illustrated), an oxidizing gas discharge pipe (not illustrated), and a plurality of oxidizing gas discharge branch pipes (not illustrated).

The fuel gas supply pipe 207 is provided on the outside of the pressure vessel 205, connected to a fuel gas supply unit for supplying fuel gas having a predetermined gas composition and predetermined flow rate in accordance with the power generation amount of the SOFC module 201, and connected to the plurality of fuel gas supply branch pipes 207a. The fuel gas supply pipe 207 branches the predetermined flow rate of fuel gas supplied from the above-described fuel gas supply unit to the plurality of fuel gas supply branch pipes 207a, and guides the fuel gas. The fuel gas supply branch pipe 207a is connected to the fuel gas supply pipe 207 and is connected to the plurality of SOFC cartridges 203. The fuel gas supply branch pipe 207a guides the fuel gas supplied from the fuel gas supply pipe 207 to the plurality of SOFC cartridges 203 at substantially uniform flow rate, and makes the power generation performance of the plurality of SOFC cartridges 203 substantially uniform.

The fuel gas discharge branch pipe 209a is connected to the plurality of SOFC cartridges 203 and to the fuel gas discharge pipe 209. The fuel gas discharge branch pipe 209a guides the exhaust fuel gas discharged from the SOFC cartridge 203 to the fuel gas discharge pipe 209. The fuel gas discharge pipe 209 is connected to the plurality of fuel gas discharge branch pipes 209a, and a part thereof is disposed on the outside of the pressure vessel 205. The fuel gas discharge pipe 209 guides the exhaust fuel gas derived from the fuel gas discharge branch pipe 209a at a substantially equal flow rate to the outside of the pressure vessel 205.

Since the pressure vessel 205 is operated at internal pressure of 0.1 MPa to approximately 3 MPa and at internal temperature of the atmospheric temperature to approximately 550° C., material that maintains pressure tolerance and corrosion resistance with respect to oxygen containing gas, such as oxygen contained in the oxidizing gas, is used. For example, stainless steel material such as SUS304 is suitable.

Here, in the present embodiment, aspect in which the plurality of SOFC cartridges 203 are assembled and stored in the pressure vessel 205 is described, but the present invention is not limited thereto, and aspect in which the SOFC cartridges 203 are not assembled and stored in the pressure vessel 205 can also be employed.

As illustrated in FIG. 3, the SOFC cartridge 203 includes a plurality of cell stacks 101, a power generation chamber 215, a fuel gas supply header 217, a fuel gas discharge header 219, an oxidizing gas (air) supply header 221, and an oxidizing gas discharge header 223. The SOFC cartridge 203 includes an upper tube plate 225a, a lower tube plate 225b, an upper thermal insulation 227a, and a lower thermal insulation 227b. In the present embodiment, the SOFC cartridge 203 has a structure in which the fuel gas supply header 217, the fuel gas discharge header 219, the oxidizing gas supply header 221, and the oxidizing gas discharge header 223 are arranged as illustrated in FIG. 3 such that the fuel gas and the oxidizing gas flow while facing the inner side and the outer side of the cell stack 101, but this structure is not necessary, and, for example, the gas may flow while being parallel to the inner side and the outer side of the cell stack 101, and the oxidizing gas may flow in a cross flow to an axial direction of the cell stack 101.

The power generation chamber 215 is a region formed between the upper thermal insulation 227a and the lower thermal insulation 227b. The power generation chamber 215 is a region where the fuel cells 105 of the cell stack 101 are arranged, and is a region where power is generated by electrochemically reacting the fuel gas and the oxidizing gas. The temperature in the vicinity of center portion of the power generation chamber 215 in the longitudinal direction of the cell stack 101 is monitored by a temperature measurement unit (temperature sensor, thermocouple, or the like), and high temperature atmosphere of approximately 700° C. to 1000° C. is achieved during the steady operation of the SOFC module 201.

The fuel gas supply header 217 is a region surrounded by an upper casing 229a and an upper tube plate 225a of the SOFC cartridge 203, and is connected to the fuel gas supply branch pipe 207a through a fuel gas supply hole 231a provided in upper portion of the upper casing 229a. The plurality of cell stacks 101 are joined to the upper tube plate 225a by a seal member 237a, and the fuel gas supply header 217 guides the fuel gas supplied from the fuel gas supply branch pipe 207a through the fuel gas supply hole 231a at substantially uniform flow rate on the inside of the substrate tube 103 of the plurality of cell stacks 101, and makes the power generation performance of the plurality of cell stacks 101 substantially uniform.

The fuel gas discharge header 219 is a region surrounded by a lower casing 229b and the lower tube plate 225b of the SOFC cartridge 203, and is connected to the fuel gas discharge branch pipe 209a (not illustrated) through a fuel gas discharging hole 231b provided in the lower casing 229b. The plurality of cell stacks 101 are joined to the lower tube plate 225b by a seal member 237b, and the fuel gas discharge header 219 collects the exhaust fuel gas that passes through the inside of the substrate tube 103 of the plurality of cell stacks 101 and that is supplied to the fuel gas discharge header 219, and guides the exhaust fuel gas to the fuel gas discharge branch pipe 209a through the fuel gas discharging hole 231b.

Oxidizing gas having predetermined gas composition and predetermined flow rate is branched into the oxidizing gas supply branch pipe in accordance with the power generation amount of the SOFC module 201 and is supplied to a plurality of SOFC cartridges 203. The oxidizing gas supply header 221 is a region surrounded by the lower casing 229b, the lower tube plate 225b, and the lower thermal insulation 227b of the SOFC cartridge 203, and is connected to the oxidizing gas supply branch pipe (not illustrated) through an oxidizing gas supply hole 233a provided on side surface of the lower casing 229b. The oxidizing gas supply header 221 guides predetermined flow rate of oxidizing gas supplied from the oxidizing gas supply branch pipe (not illustrated) through the oxidizing gas supply hole 233a, to the power generation chamber 215 through an oxidizing gas supply gap 235a which will be described later.

The oxidizing gas discharge header 223 is a region surrounded by the upper casing 229a, the upper tube plate 225a, and the upper thermal insulation 227a of the SOFC cartridge 203, and is connected to an oxidizing gas discharge branch pipe (not illustrated) through an oxidizing gas discharging hole 233b provided on the side surface of the upper casing 229a. The oxidizing gas discharge header 223 guides the exhaust oxidizing gas supplied from the power generation chamber 215 to the oxidizing gas discharge header 223 through an oxidizing gas discharge gap 235b which will be described later, to the oxidizing gas discharge branch pipe (not illustrated) through the oxidizing gas discharging hole 233b.

The upper tube plate 225a is fixed to the side plate of the upper casing 229a such that the upper tube plate 225a, the top plate of the upper casing 229a, and the upper thermal insulation 227a are substantially parallel to each other, between the top plate of the upper casing 229a and the upper thermal insulation 227a. The upper tube plate 225a has a plurality of holes corresponding to the number of cell stacks 101 provided in the SOFC cartridge 203, and the cell stacks 101 are respectively inserted into the holes. The upper tube plate 225a airtightly supports one end portion of the plurality of cell stacks 101 via one or both of the seal member 237a and an adhesive member, and further isolates the fuel gas supply header 217 and the oxidizing gas discharge header 223 from each other.

The upper thermal insulation 227a is disposed at lower end portion of the upper casing 229a such that the upper thermal insulation 227a, the top plate of the upper casing 229a, and the upper tube plate 225a are substantially parallel to each other, and is fixed to the side plate of the upper casing 229a. The upper thermal insulation 227a has a plurality of holes corresponding to the number of cell stacks 101 provided in the SOFC cartridge 203. The diameter of the hole is set to be higher than the outer diameter of the cell stack 101. The upper thermal insulation 227a includes an oxidizing gas discharge gap 235b formed between the inner surface of the hole and the outer surface of the cell stack 101 inserted into the upper thermal insulation 227a.

The upper thermal insulation 227a separates the power generation chamber 215 and the oxidizing gas discharge header 223 from each other, the temperature increase of the atmosphere around the upper tube plate 225a, which causes the strength deterioration or increase in corrosion due to the oxygen containing gas contained in the oxidizing gas, is suppressed. The upper tube plate 225a and the like are made of high temperature durable metallic material such as Inconel to prevent thermal deformation since the upper tube plate 225a and the like are exposed to the high temperature in the power generation chamber 215, and the temperature difference in the upper tube plate 225a and the like increases. The upper thermal insulation 227a guides the exhaust oxidizing gas that has passed through the power generation chamber 215 and that has been exposed to the high temperature, to the oxidizing gas discharge header 223 through the oxidizing gas discharge gap 235b.

According to the present embodiment, due to the structure of the above-described SOFC cartridge 203, the fuel gas and the oxidizing gas flow while facing the inner side and the outer side of the cell stack 101. Accordingly, the exhaust oxidizing gas exchanges heat with the fuel gas supplied to the power generation chamber 215 through the inside of the substrate tube 103, is cooled to temperature at which deformation such as buckling of the upper tube plate 225a and the like made of metallic material does not occur, and is supplied to the oxidizing gas discharge header 223. The temperature of the fuel gas increases via the heat exchange with the exhaust oxidizing gas discharged from the power generation chamber 215, and the fuel gas is supplied to the power generation chamber 215. As a result, it is possible to supply the fuel gas preheated to temperature suitable for power generation without using a heater or the like, to the power generation chamber 215.

The lower tube plate 225b is fixed to the side plate of the lower casing 229b such that the lower tube plate 225b, the bottom plate of the lower casing 229b, and the lower thermal insulation 227b are substantially parallel to each other, between the bottom plate of the lower casing 229b and the lower thermal insulation 227b. The lower tube plate 225b has a plurality of holes corresponding to the number of cell stacks 101 provided in the SOFC cartridge 203, and the cell stacks 101 are respectively inserted into the holes. The lower tube plate 225b airtightly supports the other end portion of the plurality of cell stacks 101 via one or both of the seal member 237b and an adhesive member, and further isolates the fuel gas discharge header 219 and the oxidizing gas supply header 221 from each other.

The lower thermal insulation 227b is disposed at upper end portion of the lower casing 229b such that the lower thermal insulation 227b, the bottom plate of the lower casing 229b, and the lower tube plate 225b are substantially parallel to each other, and is fixed to the side plate of the lower casing 229b. The lower thermal insulation 227b has a plurality of holes corresponding to the number of cell stacks 101 provided in the SOFC cartridge 203. The diameter of the hole is set to be higher than the outer diameter of the cell stack 101. The lower thermal insulation 227b includes the oxidizing gas supply gap 235a formed between the inner surface of the hole and the outer surface of the cell stack 101 inserted into the lower thermal insulation 227b.

The lower thermal insulation 227b separates the power generation chamber 215 and the oxidizing gas supply header 221 from each other, the temperature of the atmosphere around the lower tube plate 225b increases, and the strength deterioration or increase in corrosion due to the oxygen containing gas contained in the oxidizing gas is suppressed. The lower tube plate 225b and the like are made of high temperature durable metallic material such as Inconel, but thermal deformation is prevented since the lower tube plate 225b and the like are exposed to the high temperature, and the temperature difference in the lower tube plate 225b and the like increases. The lower thermal insulation 227b guides the oxidizing gas supplied to the oxidizing gas supply header 221 to the power generation chamber 215 through the oxidizing gas supply gap 235a.

According to the present embodiment, due to the structure of the above-described SOFC cartridge 203, the fuel gas and the oxidizing gas flow while facing the inner side and the outer side of the cell stack 101. Accordingly, the exhaust fuel gas that has passed through the power generation chamber 215 exchanges heat with the oxidizing gas supplied to the power generation chamber 215 through the inside of the substrate tube 103, is cooled to temperature at which deformation such as buckling of the lower tube plate 225b and the like made of metallic material does not occur, and is supplied to the fuel gas discharge header 219. The temperature of the oxidizing gas increases via the heat exchange with the exhaust fuel gas, and the fuel gas is supplied to the power generation chamber 215. As a result, it is possible to supply the oxidizing gas of which the temperature has increased to temperature necessary for power generation without using a heater or the like, to the power generation chamber 215.

After the DC power generated in the power generation chamber 215 is conducted to the vicinity of the end portion of the cell stack 101 by the lead film 115 made of Ni/YSZ or the like provided in the plurality of fuel cells 105, the DC power is collected on a current collecting rod (not illustrated) of the SOFC cartridge 203 through a current collecting plate (not illustrated), and is taken out to the outside of each of the SOFC cartridges 203. The DC power conducted to the outside of the SOFC cartridge 203 by the current collecting rod connects the generated power of each SOFC cartridge 203 to predetermined serial number and parallel number, is conducted to the outside of the SOFC module 201, converted to predetermined AC power via a power conversion device (such as an inverter), a power conditioner and the like (not illustrated), and is supplied to a power consumer (for example, electric load equipment or a power grid).

A schematic configuration of fuel cell system 310 according to embodiment of the present disclosure will be described.

Figure 4:
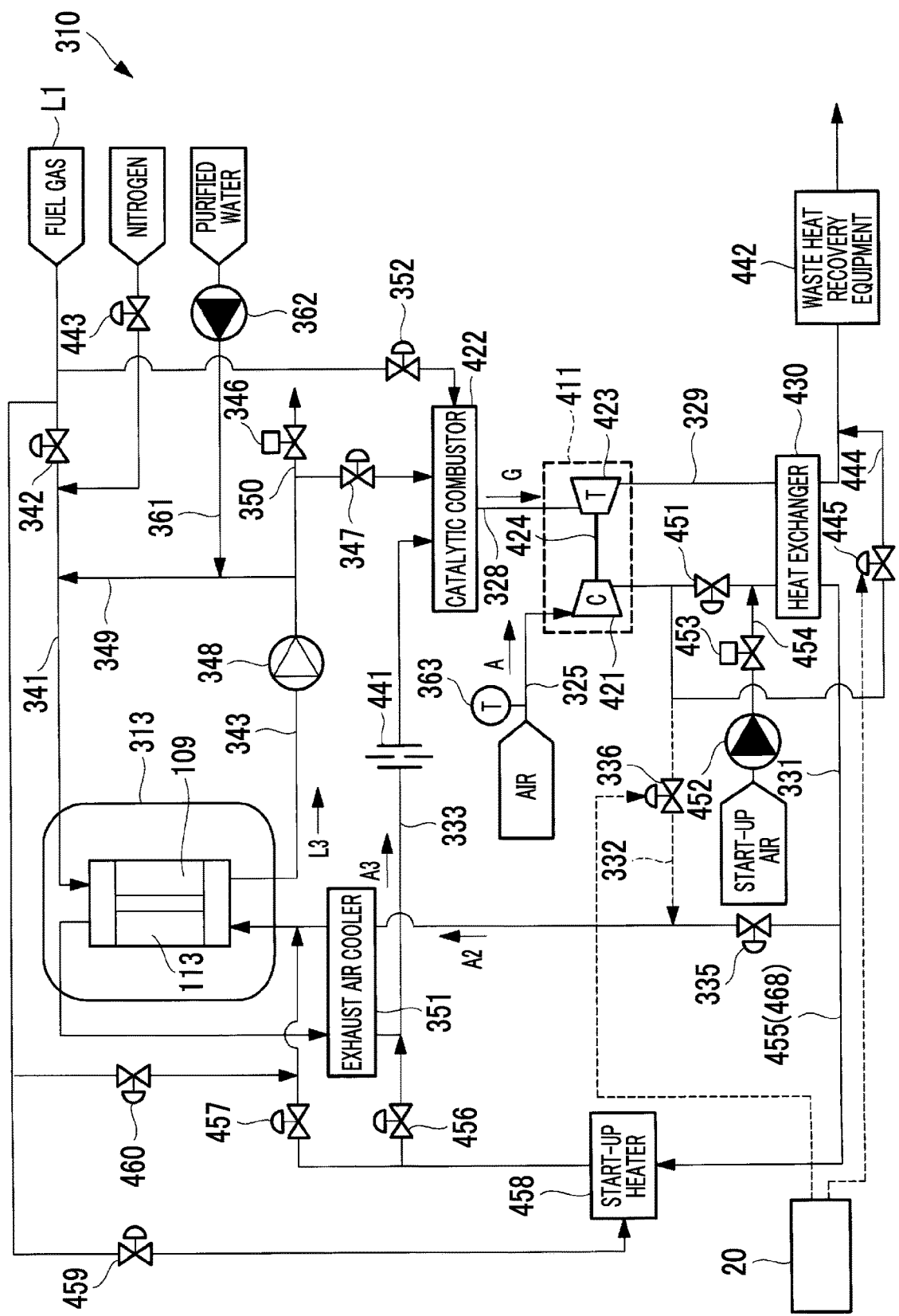
FIG. 4 shows schematic configuration of fuel cell system according to the first embodiment of the present disclosure.

FIG. 4 shows a schematic configuration of the fuel cell system 310 according to the embodiment of the present disclosure. As illustrated in FIG. 4, the fuel cell system 310 includes a turbocharger 411 and SOFC 313. The SOFC 313 is configured by combining one or a plurality of SOFC modules (not illustrated), and is hereinafter simply referred to as "SOFC". The fuel cell system 310 uses the SOFC 313 to generate power. The fuel cell system 310 is controlled by the control unit 20.

The turbocharger 411 includes a compressor 421 and a turbine 423, and the compressor 421 and the turbine 423 are connected to each other by a rotary shaft 424 so as to be integrally rotatable. The compressor 421 is rotationally driven by rotation of the turbine 423 which will be described later. The present embodiment is example in which air is used as the oxidizing gas, and the compressor 421 compresses air A taken in from air intake line 325.

The air A is taken into the compressor 421 that configures the turbocharger 411 and is compressed, and the compressed air A is supplied as oxidizing gas A2 to the cathode 113 of the SOFC. Exhaust oxidizing gas A3 after being used in the chemical reaction for power generation in the SOFC is sent to a catalytic combustor (combustor) 422 via exhaust oxidizing gas line 333, exhaust fuel gas L3 used in the chemical reaction for power generation in the SOFC is boosted by a recycling blower 348, and a part of the exhaust fuel gas L3 is recycled and supplied to fuel gas line 341 via fuel gas recycling line 349, and the other part is sent to the catalytic combustor 422 via exhaust fuel gas line 343.

In this manner, a part of the exhaust fuel gas L3 and the exhaust oxidizing gas A3 is supplied to the catalytic combustor 422, and stably performs combustion even at relatively low temperature using a combustion catalyst in a catalytic combustion unit (not illustrated) (described below) to generate combustion gas G.

The catalytic combustor 422 mixes the exhaust fuel gas L3, the exhaust oxidizing gas A3, and fuel gas L1 if necessary, and combusts the mixed gas in the catalytic combustion unit (not illustrated) to generate the combustion gas G. The catalytic combustion unit is filled with a combustion catalyst containing, for example, platinum or palladium as a main catalytic component, and stable combustion is possible at relatively low temperature and at a low oxygen concentration. The combustion gas G is supplied to the turbine 423 through combustion gas supply line 328. The turbine 423 is rotationally driven by the adiabatic expansion of the combustion gas G, and the combustion gas G is discharged from combustion exhaust gas line 329.

The fuel gas L1 is supplied to the catalytic combustor 422 by controlling the flow rate with a control valve 352. The fuel gas L1 is combustible gas, and, for example, gas obtained by vaporizing liquefied natural gas (LNG) or natural gas, town gas, hydrogen ($H_2$), carbon monoxide (CO), hydrocarbon gases such as methane ($CH_4$), and gas produced by a gasification facility from carbonaceous raw materials (petroleum, coal, and the like) are used. The fuel gas means fuel gas of which calorific value has been regulated to be substantially constant in advance.

The combustion gas G of which the temperature has been raised by combustion in the catalytic combustor 422 is sent to the turbine 423 that configures the turbocharger 411 through the combustion gas supply line 328, and the turbine 423 is rotationally driven to generate rotational power. By driving the compressor 421 with this rotational power, the air A taken in from the air intake line 325 is compressed to generate compressed air. Since the power of the rotating device that compresses and blows the oxidizing gas (air) can be generated by the turbocharger 411, the required additional power can be reduced, and the power generation efficiency of the power generation system can be improved.

A heat exchanger (regenerative heat exchanger) 430 exchanges heat between the exhaust gas discharged from the turbine 423 and the oxidizing gas A2 supplied from the compressor 421. The exhaust gas is cooled by heat exchange with the oxidizing gas A2, and then released to the outside through a chimney (not illustrated), for example, through waste heat recovery equipment 442.

The SOFC 313 generates power by reacting at predetermined operating temperature by supplying the fuel gas L1 as reducing agent and the oxidizing gas A2 as oxygen containing gas.

The SOFC 313 is constituted of an SOFC module (not illustrated) and accommodates an aggregate of the plurality of cell stacks provided in the pressure vessel of the SOFC module, and the anode 109, the cathode 113, and the solid electrolyte film 111 are provided in the cell stack (not illustrated).

The SOFC 313 generates power by supplying the oxidizing gas A2 to the cathode 113 and supplying the fuel gas L1 to the anode 109, converts the power to predetermined power via a power conversion device (such as an inverter) such as a power conditioner (not illustrated), and supplies the converted power to a power consumer.

The SOFC 313 is connected to oxidizing gas supply line 331 for supplying the oxidizing gas A2 compressed by the compressor 421 to the cathode 113. The oxidizing gas A2 is supplied to an oxidizing gas introduction unit (not illustrated) of the cathode 113 through the oxidizing gas supply line 331. The oxidizing gas supply line 331 is provided with a control valve 335 for regulating the flow rate of the oxidizing gas A2 to be supplied. In the heat exchanger 430, the oxidizing gas A2 exchanges heat with the combustion gas discharged from the combustion exhaust gas line 329, and the temperature thereof increases. Furthermore, heat exchanger bypass line 332 that bypasses the heat transfer part of the heat exchanger 430 is provided in the oxidizing gas supply line 331. A control valve 336 is provided in the heat exchanger bypass line 332 such that the bypass flow rate of the oxidizing gas can be regulated. By controlling the opening of the control valve 335 and the control valve 336, the flow ratio of the oxidizing gas passing through the heat exchanger 430 and the oxidizing gas bypassing the heat exchanger 430 is regulated, and the temperature of the oxidizing gas A2 to be supplied to the SOFC 313 is regulated. The temperature of the oxidizing gas A2 supplied to the SOFC 313 maintains temperature at which the fuel gas of the SOFC 313 and the oxidizing gas are electrochemically reacted to generate power, and the upper limit of temperature is limited so as not to damage the materials of each component on the inside of the SOFC module (not illustrated) that configures the SOFC 313.

The SOFC 313 is connected to the exhaust oxidizing gas line 333 for supplying the exhaust oxidizing gas A3 discharged after being used by the cathode 113 to the turbine 423 via the catalytic combustor 422. The exhaust oxidizing gas line 333 is provided with an exhaust air cooler 351. Specifically, in the exhaust oxidizing gas line 333, the exhaust air cooler 351 is provided on the upstream side of an orifice 441 described later, and the exhaust oxidizing gas A3 is cooled by heat exchange with the oxidizing gas A2 flowing through the oxidizing gas supply line 331.

The exhaust oxidizing gas line 333 is provided with a pressure loss unit. In the present embodiment, the orifice 441 is provided as a pressure loss unit. The orifice 441 adds pressure loss to the exhaust oxidizing gas A3 that flows through the exhaust oxidizing gas line 333. The pressure loss unit is not limited to the orifice 441, and a throttle such as a Venturi tube may be provided, and any means capable of adding pressure loss to the exhaust oxidizing gas A3 can be used. As the pressure loss unit, for example, an additional burner may be provided. The additional burner causes pressure loss in the exhaust oxidizing gas, and the additional fuel can be combusted when combustion exceeding the combustion capacity of the catalytic combustor 422 is required. Therefore, a sufficient amount of heat can be supplied to the exhaust oxidizing gas. In the fuel cell system 310, the pressure difference between the cathode 113 side and the anode 109 side is controlled by a regulating valve 347 provided in the exhaust fuel gas line 343 so as to be within predetermined range, and thus, by adding pressure loss to the exhaust oxidizing gas line 333 that merges with the exhaust fuel gas line 343, it is possible to ensure the operating differential pressure required for stable control of the regulating valve 347 provided in the exhaust fuel gas line 343.

The exhaust oxidizing gas line 333 is not provided with vent system and a vent valve for releasing the exhaust oxidizing gas A3 to the atmosphere (outside the system). For example, in case of power generation system that combines the SOFC and the gas turbine (for example, a micro gas turbine) that combusts the exhaust oxidizing gas A3 discharged from the cathode 113 and the exhaust fuel gas L3 discharged from the anode 109, there is case where the pressure state of the oxidizing gas supplied to the cathode 113 changes according to the change in the state of the micro gas turbine at the time of start-up or stop, and further, there is possibility that the differential pressure control between the anode 109 and the cathode 113 becomes unsuccessful because of sudden fluctuations in pressure. Therefore, in case where a trip occurs for some reason, the generator of the micro gas turbine becomes unloaded, and protection measures for the micro gas turbine are required. Therefore, vent system and a vent valve that release the exhaust oxidizing gas A3 to the outside of the system such as to the atmosphere are required. However, in the present embodiment, the turbocharger 411 is used, there is no generator communicating with the rotary shaft, and the load is not applied. Therefore, since there is no case where the load disappears during the trip, over-rotation occurs, and the pressure increases sharply, the differential pressure state can be stably controlled by the regulating valve 347, and thus, a mechanism (bent system and vent valve) for releasing the exhaust oxidizing gas A3 to the atmosphere can be omitted.

The SOFC 313 is further connected to the fuel gas line 341 for supplying the fuel gas L1 to a fuel gas introduction unit (not illustrated) of the anode 109, and to the exhaust fuel gas line 343 for supplying the exhaust fuel gas L3, which is discharged after being used for the reaction in the anode 109, to the turbine 423 via the catalytic combustor 422. The fuel gas line 341 is provided with a control valve 342 for regulating the flow rate of the fuel gas L1 supplied to the anode 109.

The recycling blower 348 is provided in the exhaust fuel gas line 343. The exhaust fuel gas line 343 is provided with the regulating valve 347 for regulating the flow rate of a part of the exhaust fuel gas L3 supplied to the catalytic combustor 422. In other words, the regulating valve 347 regulates the pressure state of the exhaust fuel gas L3. Therefore, as will be described later, the differential pressure between the anode 109 and the cathode 113 can be regulated by controlling the regulating valve 347 with the control unit 20.

Exhaust fuel gas release line 350 that releases the exhaust fuel gas L3 to the atmosphere (outside the system) is connected to the exhaust fuel gas line 343 on the downstream side of the recycling blower 348. A shutoff valve (fuel vent valve) 346 is provided on the exhaust fuel gas release line 350. In other words, by opening the shutoff valve 346, a part of the exhaust fuel gas L3 of the exhaust fuel gas line 343 can be released from the exhaust fuel gas release line 350. By discharging the exhaust fuel gas L3 to the outside of the system, the excess pressure can be quickly regulated. In the exhaust fuel gas line 343, the fuel gas recycling line 349 for recycling the exhaust fuel gas L3 to the fuel gas introduction unit of the anode 109 of the SOFC 313 is connected to the fuel gas line 341.

Furthermore, the fuel gas recycling line 349 is provided with purified water supply line 361 for supplying purified water for reforming the fuel gas L1 at the anode 109. The purified water supply line 361 is provided with a pump 362. By controlling the discharge flow rate of the pump 362, the amount of purified water supplied to the anode 109 is regulated. Since water vapor is generated at the anode during power generation, the exhaust fuel gas L3 of the exhaust fuel gas line 343 contains water vapor. Therefore, the water vapor is recycled and supplied by the fuel gas recycling line 349, and accordingly, the flow rate of purified water supplied by the purified water supply line 361 can be decreased or cut off.

Next, a configuration for releasing the oxidizing gas discharged from the compressor 421 will be described. Specifically, in the oxidizing gas supply line 331 on the downstream side of the compressor 421, oxidizing gas blow line 444 is provided such that the oxidizing gas can flow so as to bypass the heat exchanger 430 and be released. One end of the oxidizing gas blow line 444 is connected to the upstream side of the heat exchanger 430 of the oxidizing gas supply line 331, and the other end is connected to the downstream side of the heat exchanger 430 of the combustion exhaust gas line 329 which is the downstream side of the turbine 423. A release valve (air extraction blow valve) 445 is provided on the oxidizing gas blow line 444. In other words, by opening the release valve 445, a part of the oxidizing gas discharged from the compressor 421 is released to the atmosphere outside the system through the chimney (not illustrated) via the oxidizing gas blow line 444.

Next, the configuration used for starting the fuel cell system 310 will be described. The oxidizing gas supply line 331 is provided with a control valve 451 on the downstream side of the connection point with the oxidizing gas blow line 444, and the downstream side (upstream side of the heat exchanger 430) of the control valve 451 is connected to start-up air supply line 454 having a blower 452 for supplying the start-up air and a control valve 453. When performing the start-up of the fuel cell system 310, while the blower 452 supplies the start-up air to the oxidizing gas supply line 331, the control valve 451 and the control valve 453 switch to the oxidizing gas from the compressor 421. In the oxidizing gas supply line 331, start-up air heating line 455 is connected to the downstream side (upstream side of the control valve 335) of the heat exchanger 430, is connected to the exhaust oxidizing gas line 333 on the downstream side of the exhaust air cooler 351 via the control valve 456, and is connected to the oxidizing gas supply line 331 (inlet side of the cathode 113) via a control valve 457. The start-up air heating line 455 is provided with a start-up heater 458, and the fuel gas L1 is supplied via a control valve 459 to heat the oxidizing gas flowing through the start-up air heating line 455.

The control valve 457 regulates the flow rate of the oxidizing gas supplied to the start-up heater 458, and controls the temperature of the oxidizing gas supplied to the SOFC 313.

The fuel gas L1 is also supplied to the cathode 113 via a control valve 460. The control valve 460 controls, for example, the flow rate of the fuel gas L1 supplied to the cathode 113 when the fuel gas L1 is supplied to the cathode 113 from the downstream side of the control valve 457 in the start-up air heating line 455 when the SOFC 313 is started, and the temperature of the power generation chamber is raised by catalytic combustion.

The control unit 20 controls the oxidizing gas supplied to the SOFC 313 based on the ambient air temperature. In the present embodiment, the compressor 421 takes in air (ambient air) as oxidizing gas. Therefore, the ambient air temperature (atmospheric temperature) is the temperature of the air suctioned by the compressor 421. In other words, a temperature sensor 363 is provided on the air intake line 325, and the measured value is input to the control unit 20. When the temperature profile of the oxidizing gas is known, the installation position of the temperature sensor 363 is not limited. The ambient air temperature may be estimated based on other information without directly measuring the ambient air temperature.

In the configuration as illustrated in FIG. 4, the oxidizing gas blow line 444 and the heat exchanger bypass line 332 are flow paths having one end connected to the upstream side of the heat exchanger 430 for heating the oxidizing gas of the oxidizing gas supply line 331 with the combustion gas discharged from the turbine 423 on the oxidizing gas supply line 331, and bypassing the heat exchanger 430. Therefore, each of the oxidizing gas blow line 444 and the heat exchanger bypass line 332 becomes bypass line in which at least a part of the oxidizing gas bypasses the heat exchanger 430. Each of the release valve 445 provided in the oxidizing gas blow line 444 and the control valve 336 provided in the heat exchanger bypass line 332 becomes a flow regulation valve for regulating the flow rate of the oxidizing gas flowing through the bypass line.

Figure 5:
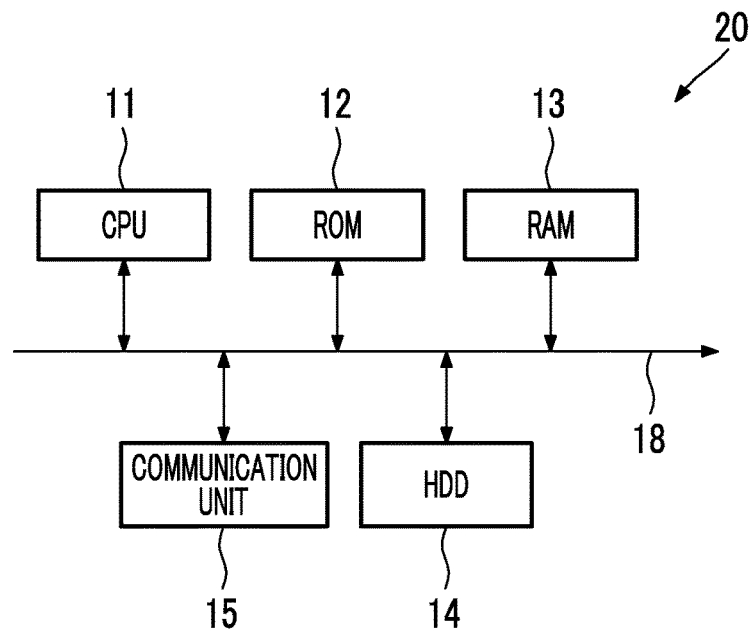
FIG. 5 shows example of a hardware configuration of a control unit according to the first embodiment of the present disclosure.

FIG. 5 shows example of a hardware configuration of the control unit 20 according to the present embodiment.

As illustrated in FIG. 5, the control unit 20 is computer system (computing system), and includes, for example, a CPU 11, a read only memory (ROM) 12 for storing a program or the like executed by the CPU 11, a random access memory (RAM) 13 that functions as a work region at the time of executing each program, a hard disk drive (HDD) 14 as a large-capacity storage device, and a communication unit 15 for connecting to a network or the like. As the large-capacity storage device, a solid state drive (SSD) may be used. Each of these parts is connected via a bus 18.

The control unit 20 may include an input unit including a keyboard, a mouse, and the like; and a display unit including a liquid crystal display device for displaying data.

The storage medium for storing the program or the like executed by the CPU 11 is not limited to the ROM 12. For example, the storage medium may be another auxiliary storage device such as a magnetic disk, a magneto-optical disk, or a semiconductor memory.

A series of processes for realizing various functions (will be described later) is stored in the hard disk drive 14 or the like in the form of a program, the CPU 11 reads the program into the RAM 13 or the like and executes information processing and arithmetic processing, and accordingly, various functions are realized. The program may be installed in advance in the ROM 12 or other storage medium, provided in state of being stored in a computer-readable storage medium, or delivered via wired or wireless communication means. Examples of the computer-readable storage medium include a magnetic disk, a magneto-optical disk, a CD-ROM, a DVD-ROM, or a semiconductor memory.

The control unit 20 controls the flow regulation valve (the release valve 445 and/or the control valve 336) based on the ambient air temperature input by, for example, the temperature sensor 363 provided in the air intake line 325, and controls the bypass flow rate of the oxidizing gas. The ambient air temperature affects the operating state of the fuel cell system 310 in each of case of being high and case of being low. Specifically, when the ambient air temperature is low, the mass flow rate of the air A supplied from the compressor 421 increases, and accordingly, the mass flow rate of the combustion gas supplied to the turbine 423 increases, resulting in choke state, and the pressure on the upstream side of the turbine 423 increases, and there is possibility that the exhaust gas exhaust resistance of the turbine 423 becomes excessive. When the ambient air temperature is high, there is possibility that the temperature of the oxidizing gas supplied to the SOFC 313 also increases and the output decreases, or the flow rate of the oxidizing gas sufficient to operate the SOFC 313 at high output cannot be supplied, and there is possibility that the operation should be performed while suppressing the output, and there is possibility that the output of the SOFC 313 cannot be maintained at the rated value. Therefore, the control unit 20 controls each case where the ambient air temperature is high or case where the ambient air temperature is low. The case where the ambient air temperature is low is that the ambient air temperature is equal to or lower than predetermined temperature. In case where the ambient air temperature is low, the predetermined temperature is set based on the state amount (ambient air temperature) at which choke state is expected to occur. The case where the ambient air temperature is high is that the ambient air temperature is equal to or higher than predetermined temperature. Regarding the predetermined temperature in case where the ambient air temperature is high, in case where the ambient air temperature increases and the temperature of the oxidizing gas at outlet of the compressor 421 increases, the temperature of the oxidizing gas supplied to the SOFC 313 is set to correspond to the temperature at which the cooling performance required for protecting the SOFC 313 is not satisfied.

First, control in case where the ambient air temperature is low will be described.

In case where the ambient air temperature is low, the air density increases, the mass flow rate of the air A supplied from the compressor 421 increases, and accordingly, the mass flow rate of the combustion gas supplied to the turbine 423 increases, resulting in choke state, and there is possibility that the exhaust gas exhaust resistance of the turbine 423 becomes excessive. Therefore, in case where the ambient air temperature is low, the mass flow rate of the combustion gas supplied to the turbine 423 is controlled.

Specifically, the control unit 20 controls the release valve 445 as a flow regulation valve for the air A supplied from the compressor 421 based on the ambient air temperature, and regulates the mass flow rate of the combustion gas finally supplied to the turbine 423 via the catalytic combustor 422 via the cathode 113 of the SOFC 313. As illustrated in FIG. 4, combustion exhaust gas line (exhaust gas line) 329 that releases the combustion gas discharged from the turbine 423 to the outside of the system is provided. In addition, one end of the oxidizing gas blow line 444 is connected to the upstream side of the heat exchanger 430 of the oxidizing gas supply line 331, and the other end is connected to the downstream side of the heat exchanger 430 of the combustion exhaust gas line 329.

Therefore, in case where the ambient air temperature is equal to or lower than predetermined value, the control unit 20 controls the release valve 445 to increase the mass flow rate of the oxidizing gas passing through the oxidizing gas blow line 444. Accordingly, a part of the oxidizing gas compressed by the compressor 421 is positioned as upstream as possible in the system of the oxidizing gas of the fuel cell system 310, and a part of the oxidizing gas can be released to the atmosphere before flowing into the SOFC 313 and the heat exchanger 430. In other words, at position upstream of the heat exchanger 430 provided at the most upstream position of the main equipment of the system of the oxidizing gas of the fuel cell system 310, the increased mass flow rate of the oxidizing gas is regulated, and the oxidizing gas that corresponds to the mass flow rate increased because of the decrease in the ambient air temperature can be released by the oxidizing gas blow line 444. Therefore, at each position on the downstream side including the heat exchanger 430 and the SOFC 313 of the system of the oxidizing gas and the exhaust oxidizing gas, the mass flow rate is regulated to be close to the mass flow rate before the oxidizing gas increases because of the decrease in the ambient air temperature, and is regulated to be close to the mass flow rate even before the increase in the mass flow rate of the combustion gas supplied to the turbine 423.

Regarding the mass flow rate of the oxidizing gas that passes through the oxidizing gas blow line 444 and that is released to line that continues to the outside of the system, for example, the mass flow rate may be set in advance with respect to the ambient air temperature, and the release valve 445 (blow valve) may be controlled to release mass flow rate set corresponding to the ambient air temperature from the oxidizing gas blow line 444 to line continuing to the outside of the system.

In this manner, oxidizing gas corresponding to the mass flow rate increased because of the decrease in the ambient air temperature is discharged to the outside of the system as excess gas from the outlet side of the compressor 421 connected to the heat exchanger 430 on the most upstream side of the flow path of the oxidizing gas system. Therefore, the mass flow rate close to the mass flow rate before the increase passes in each device of the system of the oxidizing gas and the exhaust oxidizing gas before the ambient air temperature becomes low, and thus, the performance deterioration of the SOFC 313 is suppressed. In other words, the operation can be stabilized while suppressing the decrease in system efficiency.

Next, control in case where the ambient air temperature is high will be described.

In case where the ambient air temperature is high, case where the temperature of the oxidizing gas compressed by the compressor 421 increases, the temperature of the oxidizing gas supplied to the SOFC 313 also increases and the output decreases, or the flow rate of the oxidizing gas sufficient to operate the SOFC 313 at high output cannot be supplied, occurs, and there is possibility that the operation should be performed while suppressing the output. Therefore, in case where the ambient air temperature is high, the temperature of the oxidizing gas supplied to the SOFC 313 is controlled so as not to increase.

Specifically, the control unit 20 controls the control valve 336 based on the ambient air temperature to regulate the temperature of the combustion gas supplied to the turbine 423. As illustrated in FIG. 4, one end of the heat exchanger bypass line 332 is connected to the upstream side of the heat exchanger 430 of the oxidizing gas supply line 331, and the other end is connected to the downstream side of the heat exchanger 430 of the oxidizing gas supply line 331.

Therefore, when the ambient air temperature is equal to or higher than predetermined value, the control unit 20 controls the control valve 336 to increase the flow rate of the oxidizing gas flowing through the heat exchanger bypass line 332. Accordingly, the flow rate of the oxidizing gas heated by the heat exchanger 430 can be decreased, and thus, the amount of heating to the oxidizing gas by the heat exchanger 430 is decreased. The oxidizing gas that came out of the heat exchanger 430 flows to the oxidizing gas supply line 331, merges with the oxidizing gas flowing through the heat exchanger bypass line 332, and is supplied to the cathode 113 of the SOFC 313. In other words, the temperature of the oxidizing gas A2 supplied to the cathode 113 is regulated, and even in case where the ambient air temperature is high, the temperature of the SOFC 313 and the system of the oxidizing gas and the exhaust oxidizing gas on the inside thereof can be regulated to be the temperature which is the same as that before the ambient air temperature increases.

Regarding the flow rate of the oxidizing gas in the heat exchanger bypass line 332, for example, the flow rate may be set in advance with respect to the ambient air temperature, and the flow rate set corresponding to the ambient air temperature may bypass the heat exchanger 430. For example, the flow rate of the oxidizing gas flowing through the heat exchanger bypass line 332 that bypasses the heat exchanger 430 may be regulated such that the temperature of the oxidizing gas supplied to the cathode 113 of the SOFC 313 becomes predetermined temperature, by controlling the control valve 336.

In this manner, even in case where the ambient air temperature is high, by bypassing the heat exchanger 430 on the upstream side of the oxidizing gas system, and by regulating the temperature of the oxidizing gas, the temperature of the SOFC 313 and the system of the oxidizing gas and the exhaust oxidizing gas on the inside thereof can be regulated to be the temperature which is the same as that before the ambient air temperature increases, and thus, performance deterioration of the SOFC313 can be suppressed. The increase in the temperature of the flow path through which the oxidizing gas flows (the outlet temperature of the turbine 423, the inlet temperature of the heat exchanger 430, and the like) is suppressed, and the operation can be stabilized while suppressing the decrease in system efficiency.

Figure 6:
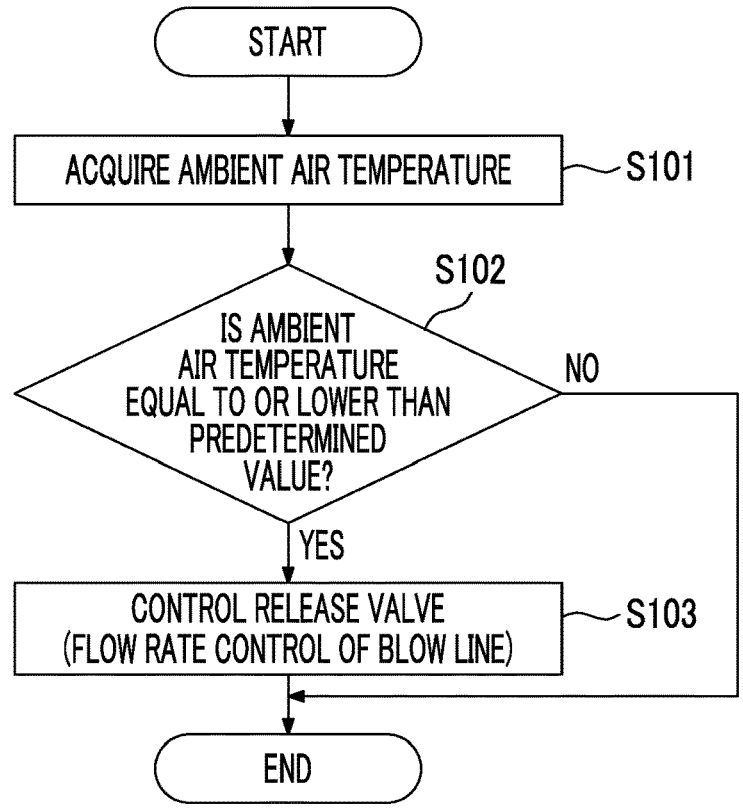
FIG. 6 shows example of flowchart of processing when the ambient air temperature is low according to the first embodiment of the present disclosure.

Next, example of processing in case where the ambient air temperature is low by the above-described control unit 20 will be described with reference to FIG. 6. FIG. 6 is a flowchart illustrating example of procedure of processing in case where ambient air temperature is low according to the present embodiment. The flow illustrated in FIG. 6 is repeatedly executed, for example, at predetermined control cycle.

First, the ambient air temperature is acquired (S101).

Next, it is determined whether or not the ambient air temperature is equal to or lower than predetermined value (S102). In S102, it is determined whether or not the ambient air temperature is low.

In case where the ambient air temperature is not equal to or less than the predetermined value (NO determination in S102), the process ends.

In case where the ambient air temperature is equal to or lower than predetermined value (YES determination in S102), the release valve 445 is controlled to regulate the flow rate of the oxidizing gas flowing through the oxidizing gas blow line 444 (S103). In S103, control is performed based on the information in which the ambient air temperature, which is equal to or lower than predetermined value, and the opening of the release valve 445 are associated in advance, and the turbine 423 is controlled so as not to be in the choke state. The flow rate of the oxidizing gas flowing through the oxidizing gas blow line 444 may be measured, and the opening of the release valve 445 may be regulated so as to have specified flow rate associated with the ambient air temperature.

Figure 7:
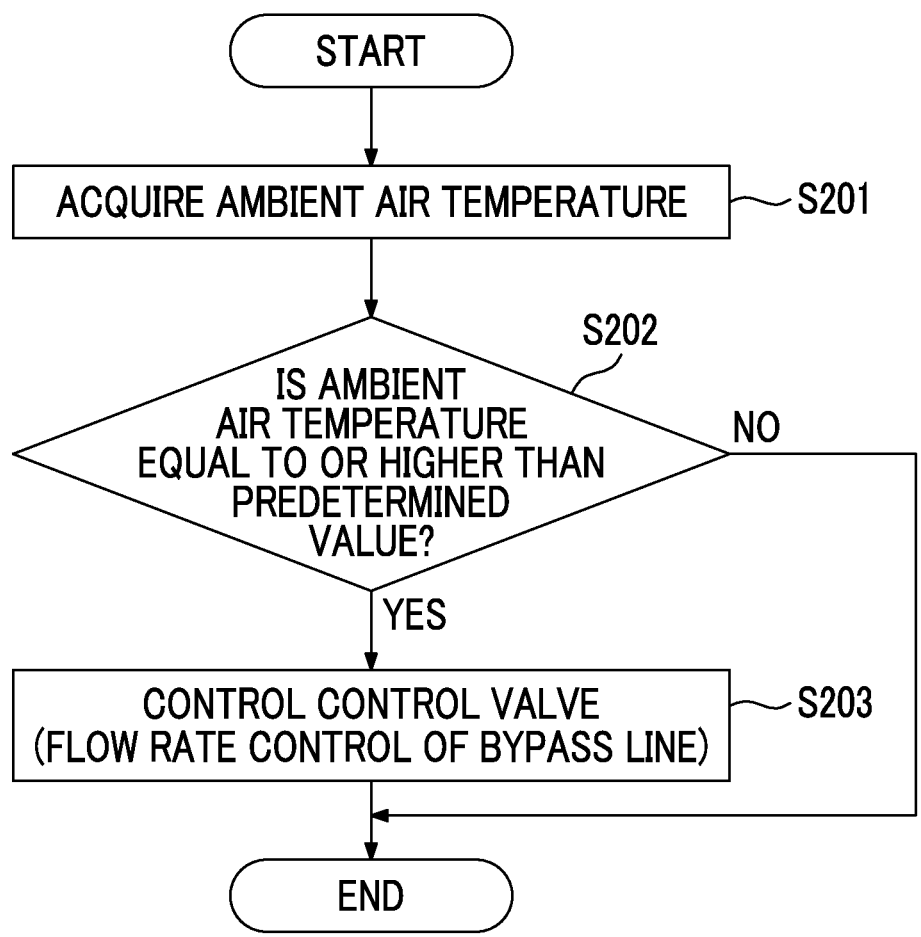
FIG. 7 shows example of flowchart of processing when ambient air temperature is high according to the first embodiment of the present disclosure.

Next, example of processing in case where the ambient air temperature is high by the above-described control unit 20 will be described with reference to FIG. 7. FIG. 7 is a flowchart illustrating example of procedure of processing in case where ambient air temperature is high according to the present embodiment. The flow illustrated in FIG. 7 is repeatedly executed, for example, at predetermined control cycle.

First, the ambient air temperature is acquired (S201).

Next, it is determined whether or not the ambient air temperature is equal to or higher than predetermined value (S202). In S202, it is determined whether or not the ambient air temperature is high.

In case where the ambient air temperature is not equal to or higher than the predetermined value (NO determination in S202), the process ends.

In case where the ambient air temperature is equal to or higher than predetermined value (YES determination in S202), the control valve 336 is controlled to regulate the flow rate of the oxidizing gas in the heat exchanger bypass line 332 (S203). In S203, control is performed based on the information in which the ambient air temperature, which is equal to or higher than predetermined value, and the opening of the control valve 336 are associated in advance, and the temperature of the combustion gas supplied to the turbine 423 is controlled to not be the inlet upper limit temperature of the turbine 423. The flow rate of the oxidizing gas in the heat exchanger bypass line 332 may be measured, and the opening of the control valve 336 may be regulated so as to have specified flow rate associated with the ambient air temperature.

Figure 8:
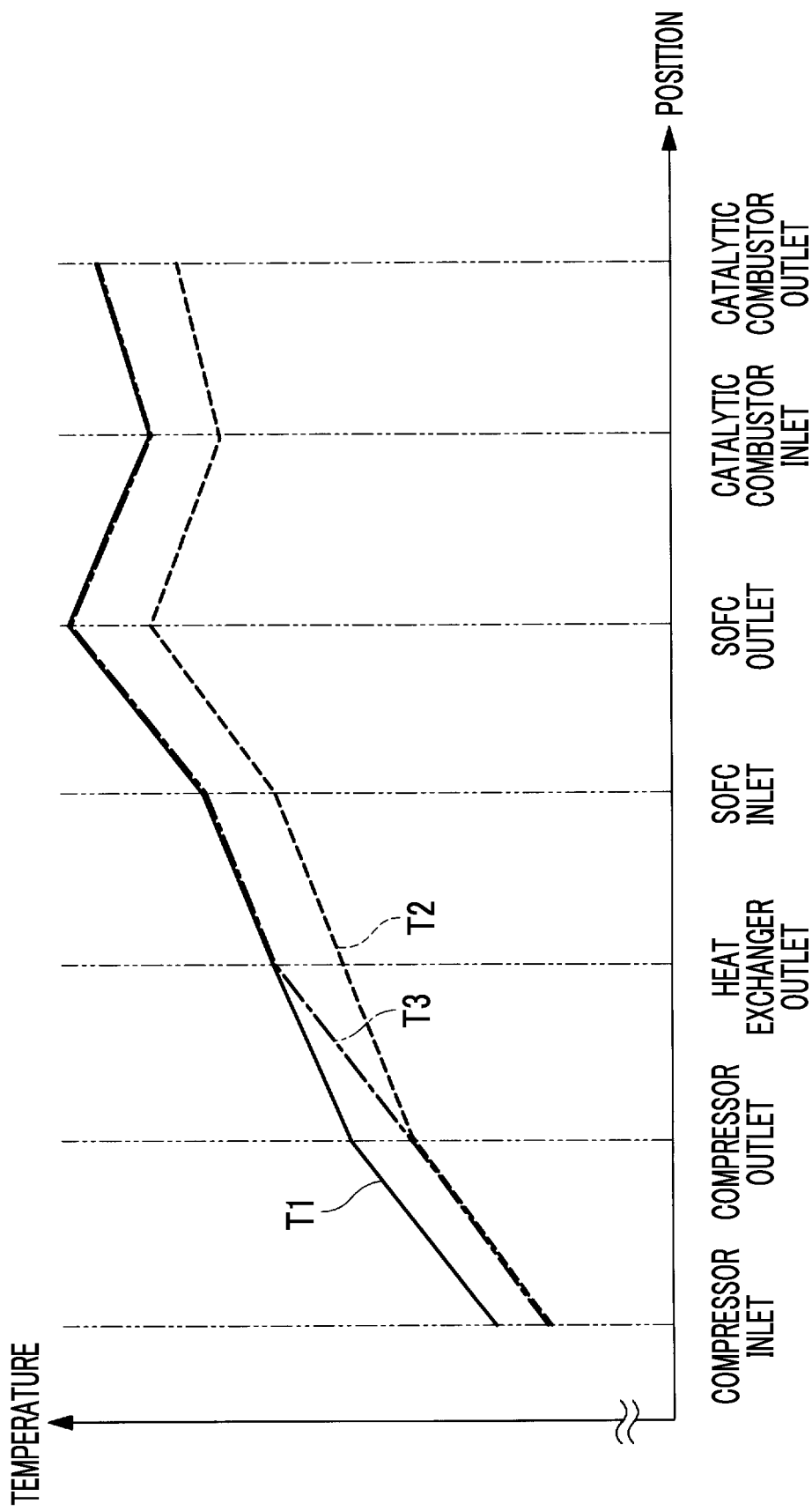
FIG. 8 is conceptual view which shows example of temperature profile in each device according to the first embodiment of the present disclosure.
Figure 9:
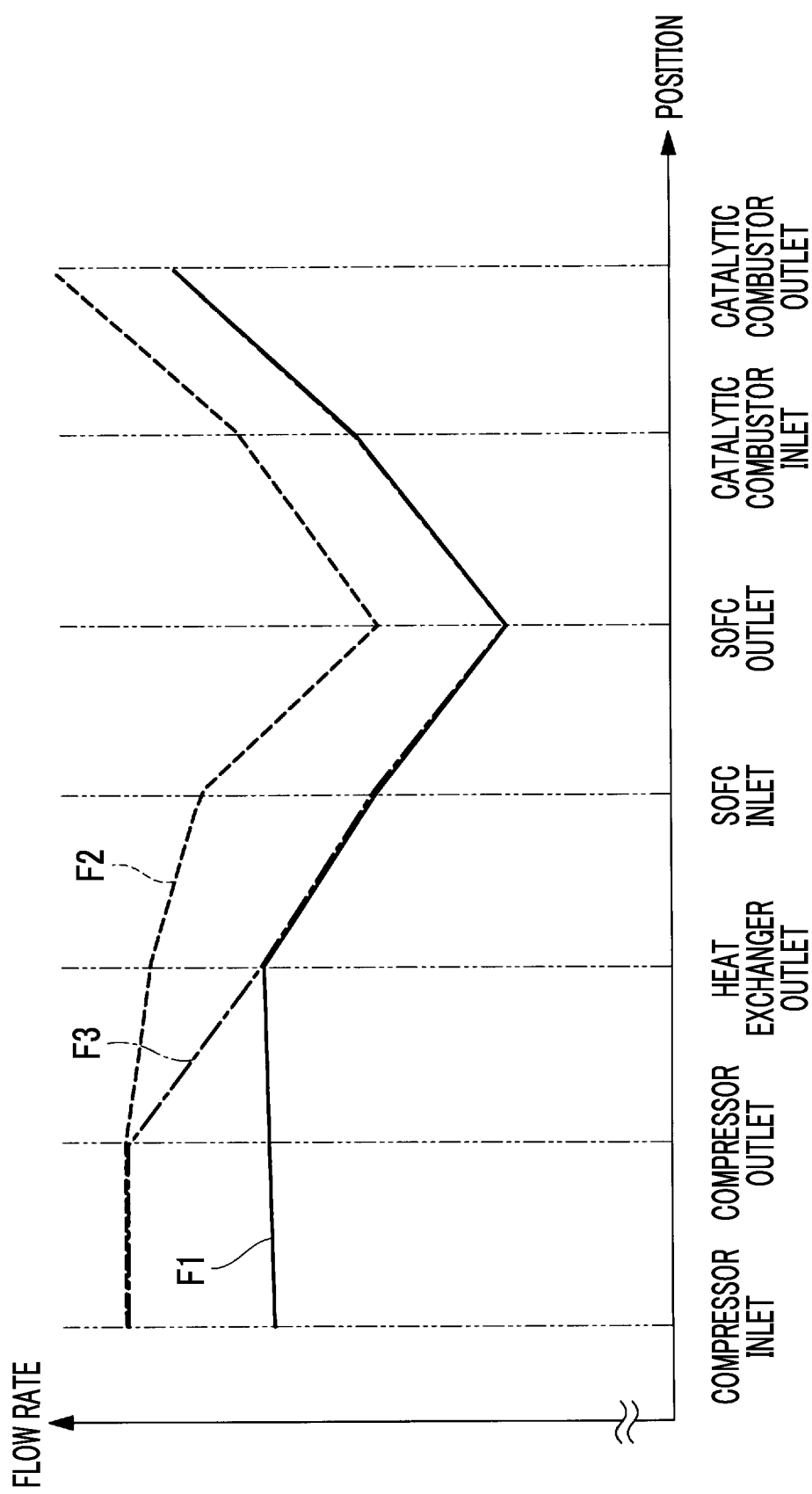
FIG. 9 is conceptual view which shows example of flow rate profile in each device according to the first embodiment of the present disclosure.

Next, the operating state of each device corresponding to the control in case where the ambient air temperature is low will be described. FIG. 8 illustrates the correspondence between each device (each position) through which the gas flows and the temperature of the flowing gas (system of the oxidizing gas and the exhaust oxidizing gas). FIG. 9 illustrates the correspondence between each device (each position) through which the gas flows and the mass flow rate of the flowing gas (system of the oxidizing gas and the exhaust oxidizing gas). For each device through which the gas flows, in order from the upstream side of the gas, states of each position of the compressor (421) inlet, the compressor outlet, the heat exchanger (430) outlet, the SOFC (313) inlet, the SOFC outlet, the catalytic combustor (422) inlet, and the catalytic combustor outlet are illustrated. In FIGS. 8 and 9, the temperature profile and the flow rate profile when the ambient air temperature is normal are respectively illustrated as T1 (solid line) and F1 (solid line), the temperature profile and the flow rate profile when the ambient air temperature is lowered (without control) are respectively illustrated as T2 (dotted line) and F2 (dotted line), and the temperature profile and the flow rate profile when the ambient air temperature is lowered (with control) are respectively illustrated as T3 (one dot chain line) and F3 (one dot chain line). "No control" means that the flow of FIG. 6 in the control unit 20 is not executed.

When the flow of FIG. 6 in the control unit 20 is not executed, as illustrated in FIG. 8, compared to T1 illustrating the case (for example, 15° C.) where the ambient air temperature is normal, in case where the ambient air temperature is low, the temperature profile is lowered as a whole as shown as T2. Then, as illustrated in FIG. 9, compared to F1 illustrating the case where the ambient air temperature is normal, in case where the ambient air temperature is low, the flow rate profile is increased as a whole as illustrated as F2. Since there is case where the turbine 423 may be in choke state when the mass flow rate increases as in F2, the control unit 20 performs the control.

Via the control by the control unit 20, as illustrated by T3 in FIG. 8, a part of the oxidizing gas flows through the oxidizing gas blow line 444, and thus, the mass flow rate in the heat exchanger 430 becomes close to that before the decrease in the ambient air temperature, the heat exchange amount per unit mass flow rate is maintained in the same manner, and the temperature of the oxidizing gas can be made similar. Therefore, the temperature profile of the oxidizing gas can be adjusted to be substantially the same as that in the normal state from the downstream side of the heat exchanger 430. As illustrated as F3 in FIG. 9, since a part of the oxidizing gas flows through the oxidizing gas blow line 444 and is exhausted to the outside of the system as excess gas, the flow rate profile of the oxidizing gas from the downstream side of the heat exchanger 430 can be adjusted in the same manner as at normal times. Therefore, even in case where the ambient air temperature is low, the temperature and mass flow rate of each of the main devices of the fuel cell system 310 are maintained to be close to that in case where the ambient air temperature is normal, while suppressing decrease in system efficiency, and choke state of the turbine 423 can be suppressed.

Figure 10:
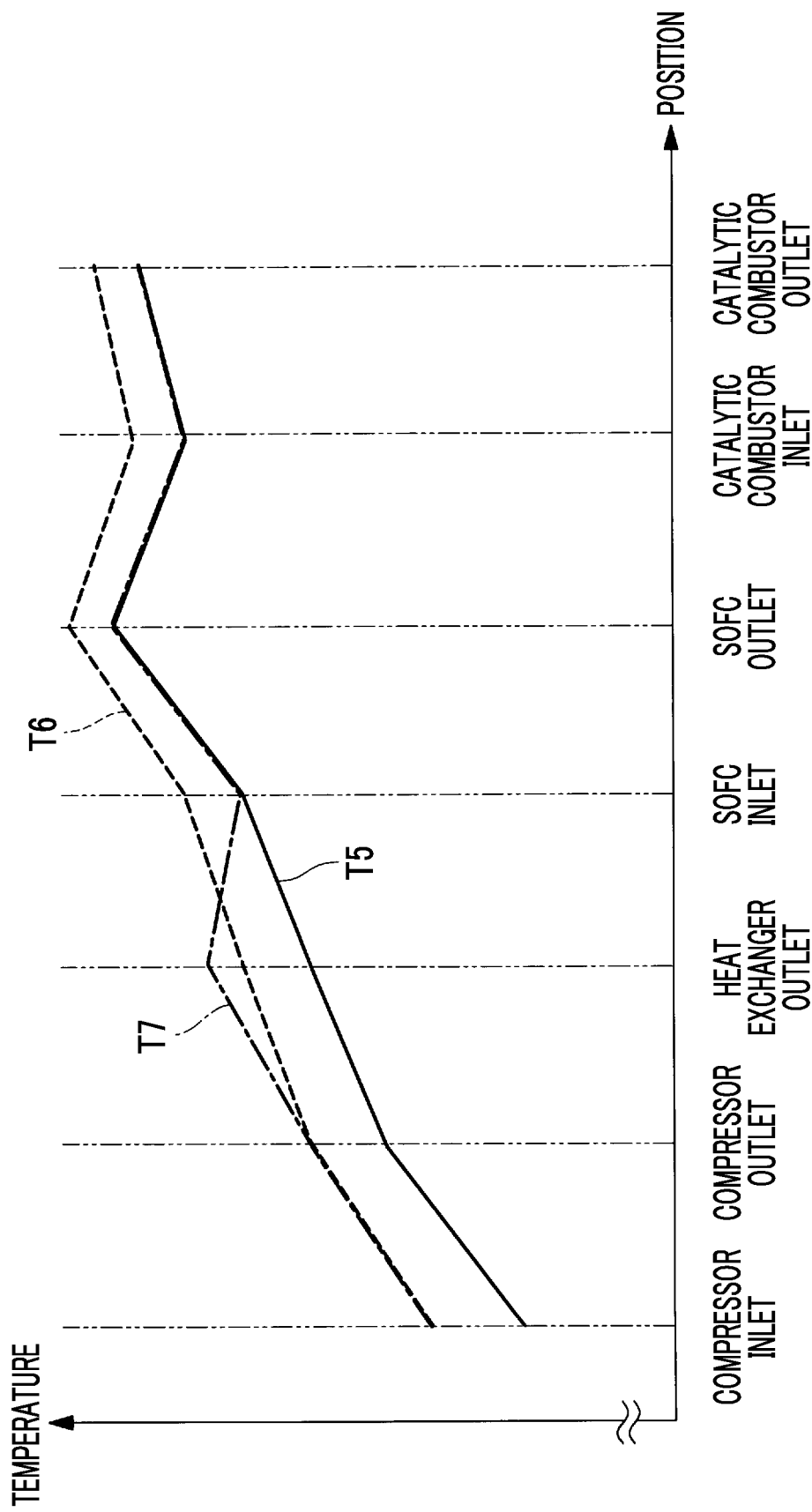
FIG. 10 is conceptual view which shows example of the temperature profile in each device according to the first embodiment of the present disclosure.
Figure 11:
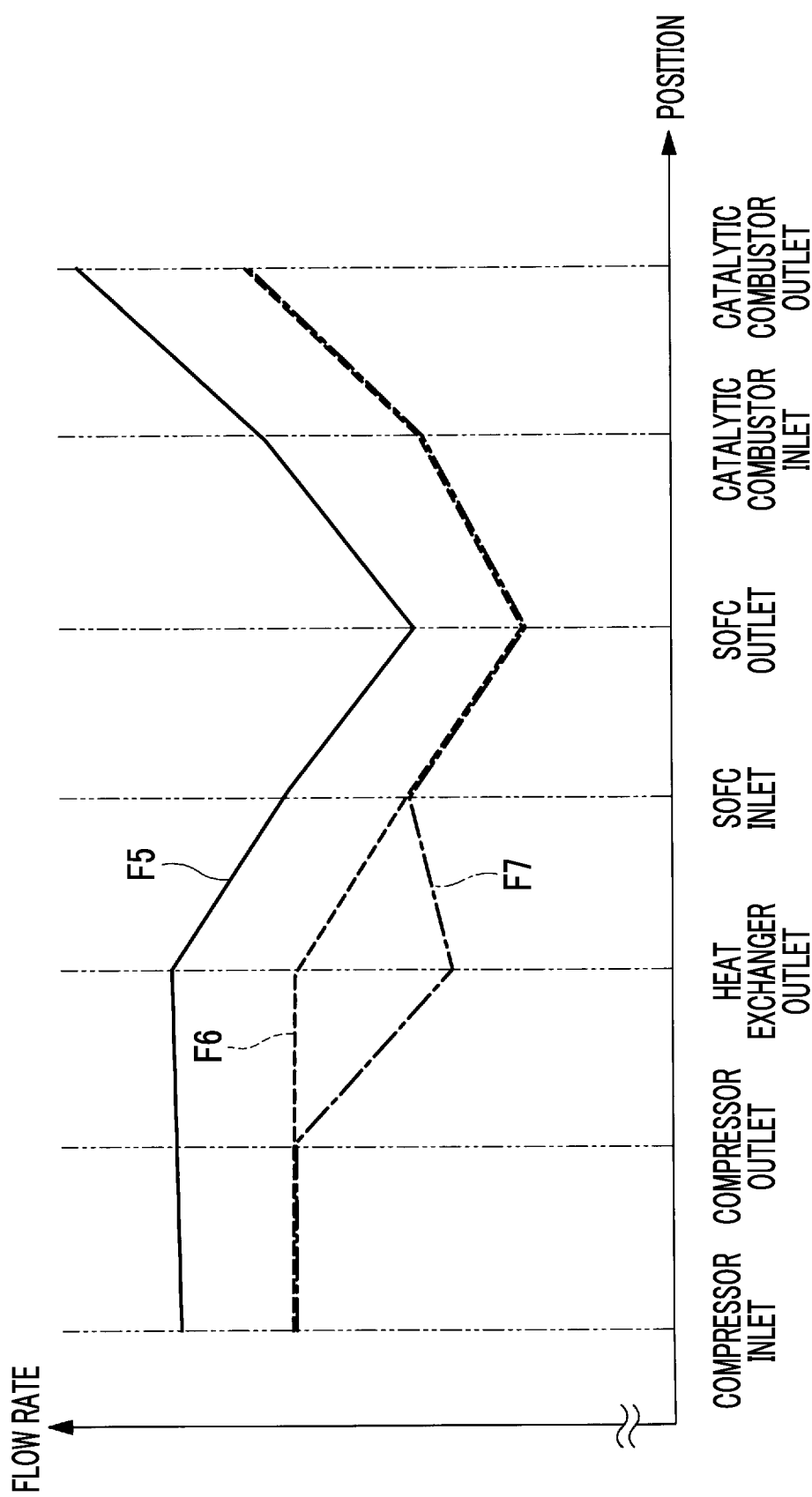
FIG. 11 is conceptual view which shows example of the flow rate profile in each device according to the first embodiment of the present disclosure.

Next, the operating state of each device corresponding to the control in case where the ambient air temperature is high will be described. FIG. 10 illustrates the correspondence between each device (each position) through which the gas flows and the temperature of the flowing gas (system of the oxidizing gas and the exhaust oxidizing gas). FIG. 11 illustrates the correspondence between each device (each position) through which the gas flows and the mass flow rate of the flowing gas (system of the oxidizing gas and the exhaust oxidizing gas). For each device through which the gas flows, in order from the upstream side of the gas, states of each position of the compressor (421) inlet, the compressor outlet, the heat exchanger (430) outlet, the SOFC (313) inlet, the SOFC outlet, the catalytic combustor (422) inlet, and the catalytic combustor outlet are illustrated. In FIGS. 10 and 11, the temperature profile and the flow rate profile when the ambient air temperature is normal are respectively illustrated as T5 (solid line) and F5 (solid line), the temperature profile and the flow rate profile when the ambient air temperature is raised (without control) are respectively illustrated as T6 (dotted line) and F6 (dotted line), and the temperature profile and the flow rate profile when the ambient air temperature is raised (with control) are respectively illustrated as T7 (one dot chain line) and F7 (one dot chain line). "No control" means case where the flow of FIG. 7 in the control unit 20 is not executed.

When the flow of FIG. 7 in the control unit 20 is not executed, as illustrated in FIG. 10, compared to T5 illustrating the case (for example, 15° C.) where the ambient air temperature is normal, in case where the ambient air temperature is high, the temperature profile is raised as a whole as shown as T6. Then, as illustrated in FIG. 11, compared to F5 illustrating the case where the ambient air temperature is normal, in case where the ambient air temperature is high, the flow rate profile is lowered as a whole as illustrated as F6. When the temperature increases as in T6, the catalytic combustor outlet temperature increases, and there is possibility that the turbine inlet temperature reaches the inlet upper limit temperature, and thus, the control unit 20 performs the control.

Via the control by the control unit 20, as illustrated as T7 in FIG. 10, a part of the oxidizing gas flows through the heat exchanger bypass line 332, and thus, the heating amount of the oxidizing gas in the heat exchanger 430 temporarily increases. However, after this, the oxidizing gas of the oxidizing gas supply line 331 flowing through the heat exchanger 430 and the unheated oxidizing gas flowing through the heat exchanger bypass line 332 bypassing the heat exchanger 430 merge with each other. Therefore, the oxidizing gas supplied to the SOFC 313 decreases to approximately T5 at the normal time. Therefore, even in case where the ambient air temperature is high, the temperature of the oxidizing gas supplied to the SOFC 313 is controlled so as not to increase. As illustrated as F7 in FIG. 11, since a part of the oxidizing gas flows through the heat exchanger bypass line 332, the flow rate of the oxidizing gas flowing through the heat exchanger 430 temporarily decreases. After this, the oxidizing gas of the oxidizing gas supply line 331 that has flowed through the heat exchanger 430 and the oxidizing gas that has flowed through the heat exchanger bypass line 332 that bypasses the heat exchanger 430 merge with each other. Therefore, the flow rate of the oxidizing gas returns to the F6 state. Even in case where the ambient air temperature is high, the temperature of each of the main devices of the fuel cell system 310 is maintained to be the same as that in case where the ambient air temperature is normal, the temperature of the oxidizing gas supplied to the SOFC 313 is controlled not to increase, and the decrease in system efficiency can be suppressed.

As described above, according to the fuel cell system and the control method therefor according to the present embodiment, the exhaust oxidizing gas A3 and the exhaust fuel gas L3 discharged from the SOFC 313 are supplied to the turbine 423 via the catalytic combustor 422, and the compressor 421 that compresses the oxidizing gas is rotationally driven by rotationally driving the turbine 423. Then, the oxidizing gas compressed by the compressor 421 is heated by the combustion exhaust gas discharged from the turbine 423 and is supplied to the SOFC 313. In such a configuration, there is possibility that the operating state becomes unstable because of the ambient air temperature. Specifically, when the ambient air temperature is low, there is possibility that the mass flow rate of the combustion gas supplied to the turbine 423 increases and the turbine 423 is in choke state. When the ambient air temperature is high, there is possibility that the temperature of the oxidizing gas supplied to the SOFC 313 increases and exceeds the upper limit temperature. Therefore, by providing the bypass line that bypasses the heat exchanger 430, and based on the ambient air temperature, by controlling the flow regulation valve (release valve) 445 of the bypass line to the oxidizing gas blow line 444 when the ambient air temperature is lower than predetermined value, or by controlling the flow regulation valve (control valve) 336 of the bypass line to the heat exchanger bypass line 332 when the ambient air temperature is higher than the predetermined value, state of the oxidizing gas supplied to the SOFC 313 can be regulated and can be state which is the same as that before the ambient air temperature changes. Therefore, it is possible to further stabilize the operation in response to fluctuations in the ambient air temperature.

When the ambient air temperature is lower than the predetermined value based on the temperature, by controlling the release valve 445, a part of the oxidizing gas in the oxidizing gas supply line 331 is bypassed to the combustion exhaust gas line 329 and can be released to the outside of the system. In other words, by regulating the mass flow rate of the oxidizing gas at the outlet of the compressor 421, it is possible to regulate the flow rate of the combustion gas supplied to the turbine 423. Accordingly, it is possible to suppress the choke state of the turbine 423. In case where the ambient air temperature is low, there is possibility that the air density increases, the mass flow rate of the oxidizing gas increases at the outlet of the compressor 421, the mass flow rate of the oxidizing gas and the exhaust oxidizing gas system increases, the mass flow rate of the combustion gas G at the outlet of the catalytic combustor 422 increases, and the mass flow rate of the combustion gas finally supplied to the turbine 423 increases. However, in case where the ambient air temperature is equal to or lower than predetermined value, the flow rate of the oxidizing gas of the oxidizing gas blow line 444 can be increased. Accordingly, it is possible to regulate the flow rate of the combustion gas supplied to the turbine 423 and to suppress the choke state of the turbine 423. Even in case where the ambient air temperature is low, the oxidizing gas corresponding to the increased mass flow rate is exhausted from the outlet side of the compressor 421 connected to the heat exchanger 430 on the most upstream side of the flow path of the oxidizing gas system to the outside of the system. Therefore, the ambient air temperature becomes low, and the mass flow rate close to the mass flow rate before the increase passes in each device of the system of the oxidizing gas and exhaust oxidizing gas. Therefore, even when the ambient air temperature changes, by controlling the bypass flow rate, the flow rate and temperature of the air supplied to the fuel cell can be maintained (change can be suppressed), and accordingly, the performance of the fuel cell can be maintained (performance deterioration can be suppressed). In other words, the operation can be stabilized while suppressing the decrease in system efficiency.

When the ambient air temperature is higher than predetermined value based on the ambient air temperature, by controlling the control valve 336, the oxidizing gas can bypass the heat exchanger 430 and flow through the heat exchanger bypass line 332. Therefore, in case where the ambient air temperature is high, case where the outlet temperature of the compressor 421 increases, the gas temperature of the oxidizing gas system increases, and the temperature of the oxidizing gas supplied to the SOFC 313 increases, can be suppressed. In case where the ambient air temperature is equal to or higher than predetermined value, by increasing the flow rate of the oxidizing gas flowing through the heat exchanger bypass line 332, it is possible to suppress the increase in the temperature of the oxidizing gas supplied to the SOFC 313 due to the increase in the ambient air temperature. Even in case where the ambient air temperature is high, the oxidizing gas temperature is regulated by bypassing the heat exchanger 430 on the most upstream side of the flow path of the oxidizing gas system, and the gas passes through at temperature which is the same as that in case where the ambient air temperature is normal in each device of the oxidizing gas system and the exhaust oxidizing gas system. Therefore, since the temperature of the oxidizing gas supplied to the SOFC 313 is maintained, the performance deterioration of the SOFC 313 can be suppressed, and the operation can be stabilized while suppressing the deterioration of the system efficiency.

In other words, the operation of the fuel cell system 310 can be further stabilized.

Second Embodiment

Next, the fuel cell system and the control method therefor according to second embodiment of the present disclosure will be described.

In the present embodiment, another control in case where the ambient air temperature is low will be described. Hereinafter, the fuel cell system and the control method therefor according to the present embodiment will be mainly described with respect to differences from the first embodiment.

Figure 12:
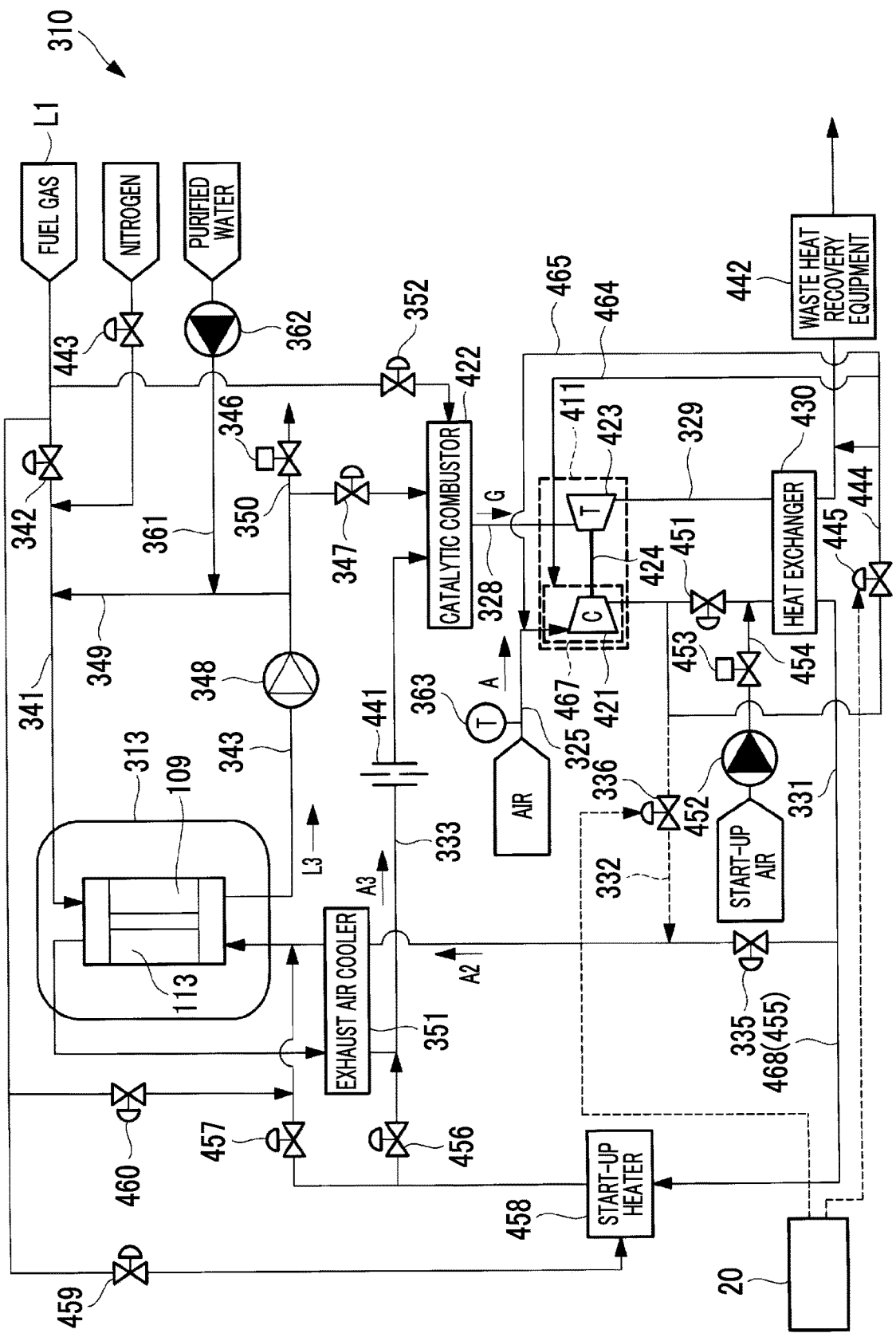
FIG. 12 shows schematic configuration of fuel cell system according to the second embodiment of the present disclosure.

As illustrated in FIG. 12, the fuel cell system 310 in the present embodiment includes warm-up line 464 and return line 465. Either one of the warm-up line 464 and the return line 465 may be provided.

The warm-up line 464 is line connected to the oxidizing gas blow line 444 and supplies the oxidizing gas to a casing 467 accommodating the compressor 421. Specifically, one end of the warm-up line 464 is connected to the downstream side of the release valve 445 in the oxidizing gas blow line 444, and the other end is connected to the casing 467 accommodating at least a part of the compressor 421 and the air intake line 325. In other words, the warm-up line 464 is line capable of supplying the compressed oxidizing gas into the casing 467.

Then, in case where the ambient air temperature is equal to or lower than predetermined value, the control unit 20 supplies the oxidizing gas to the casing 467 via the warm-up line 464. Specifically, by opening the release valve 445, the flow rate of the oxidizing gas flowing through the warm-up line 464 is controlled. A control valve may be provided in the warm-up line 464, and the flow rate of the oxidizing gas flowing through the warm-up line 464 may be regulated by the control valve. In case where the control valve is provided in the warm-up line 464, one end side of the warm-up line 464 may be provided on the upstream side of the release valve 445 in the oxidizing gas blow line 444, and the flow rate for discharging the oxidizing gas to the outside of the system and the flow rate supplied to the casing 467 may be respectively controlled.

In the control unit 20, in case where the ambient air temperature is equal to or lower than predetermined value, the compressed oxidizing gas is supplied to the casing 467 to raise the atmospheric temperature in the casing 467, and at least a part of the compressor 421 and the air intake line 325 is warmed up. By raising the atmospheric temperature, even in environment where the ambient air temperature is low, it is possible to suppress decrease in the temperature of the compressed oxidizing gas discharged from the outlet of the compressor 421 as much as possible, and to stabilize the operation.

The return line 465 is connected to the oxidizing gas blow line 444 and supplies the compressed oxidizing gas to an intake port side of the oxidizing gas in the compressor 421 so as to return the compressed oxidizing gas. Specifically, one end of the return line 465 is connected to the downstream side of the release valve 445 in the oxidizing gas blow line 444, and the other end is connected to the air intake line 325. In other words, the return line 465 is line capable of supplying the compressed oxidizing gas to the inlet of the compressor 421.

Then, in case where the ambient air temperature is equal to or lower than predetermined value, the control unit 20 supplies the oxidizing gas to the intake port side of the compressor 421 via the return line 465. Specifically, by opening the release valve 445, the flow rate of the oxidizing gas flowing through the return line 465 is controlled. A control valve may be provided in the return line 465, and the flow rate of the oxidizing gas flowing through the return line 465 may be regulated by the control valve. In case where the control valve is provided, one end side of the return line 465 may be provided on the upstream side of the release valve 445 in the oxidizing gas blow line 444, and the flow rate for discharging the oxidizing gas to the outside of the system and the flow rate supplied to the intake port side of the compressor 421 may be respectively controlled.

In the control unit 20, in case where the ambient air temperature is equal to or lower than the predetermined value, the temperature of the oxidizing gas is raised by supplying the compressed oxidizing gas to the intake port side of the compressor 421. Therefore, even in case where the ambient air temperature is low, it is possible to suppress decrease in the temperature of the compressed oxidizing gas discharged from the outlet of the compressor 421 as much as possible, and to stabilize the operation.

As described above, according to the fuel cell system and the control method therefor according to the present embodiment, the warm-up line 464 for supplying the oxidizing gas of the oxidizing gas blow line 444 is provided in the casing 467 accommodating at least a part of the compressor 421 and the air intake line 325, and in case where the ambient air temperature is equal to or lower than predetermined value, the increased amount of the mass flow rate of the oxidizing gas due to increase in the air density is not released from the oxidizing gas blow line 444 to the outside of the system, the oxidizing gas is supplied to the casing 467 via the warm-up line 464, and accordingly, the atmospheric temperature in the casing 467 can be raised. Therefore, at least a part of the compressor 421 and the air intake line 325 accommodated in the casing 467 can be warmed up. By raising the atmospheric temperature and warming up at least a part of the compressor 421 and the air intake line 325, even in environment where the ambient air temperature is low, it is possible to suppress decrease in the temperature of the compressed oxidizing gas discharged from the outlet of the compressor 421 as much as possible, and to stabilize the operation.

The return line 465 for supplying the oxidizing gas is provided on the intake port side of the oxidizing gas in the compressor 421, and in case where the ambient air temperature is equal to or lower than predetermined value, the increased amount of the mass flow rate of the oxidizing gas due to the increase in the air density is not released from the oxidizing gas blow line 444 to the outside of the system, the oxidizing gas is supplied to the intake port side of the compressor 421 via the return line 465, and accordingly, the temperature of the oxidizing gas compressed by the compressor 421 can be raised. Therefore, even in case where the ambient air temperature is low, it is possible to suppress decrease in the temperature of the compressed oxidizing gas discharged from the outlet of the compressor 421 as much as possible, and to stabilize the operation.

Third Embodiment

Next, the fuel cell system and the control method therefor according to third embodiment of the present disclosure will be described.

In the above-described first embodiment, the control of suppressing the increase in the temperature rise of the oxidizing gas by using the heat exchanger bypass line 332 in case where the temperature is high has been described, but in the present embodiment, the control for suppressing the increase in the temperature of the oxidizing gas is further described. Hereinafter, the fuel cell system and the control method therefor according to the present embodiment will be mainly described with respect to differences from the first embodiment and the second embodiment.

As illustrated in FIG. 4, the fuel cell system 310 includes the exhaust air cooler 351 that exchanges heat between the oxidizing gas A2 of the oxidizing gas supply line 331 and the exhaust oxidizing gas A3 discharged from the SOFC 313. Since the temperature of the exhaust oxidizing gas A3 is higher than that of the oxidizing gas A2, the temperature of the exhaust oxidizing gas A3 is lowered and the temperature of the oxidizing gas A2 is increased. In other words, the exhaust air cooler 351 is a heater that heats the oxidizing gas A2 of the oxidizing gas supply line 331 via the exhaust oxidizing gas A3 discharged from the SOFC 313. In other words, the oxidizing gas A2 is heated in the exhaust air cooler 351.

Here, in case where the ambient air temperature is equal to or higher than predetermined value, the control unit 20 controls the control valve 457 to increase the flow rate of the oxidizing gas of heater bypass line 468. The heater bypass line 468 has one end connected to the upstream side of the exhaust air cooler 351 and the other end connected to the downstream side of the exhaust air cooler 351 in the oxidizing gas supply line 331, and is line in which the oxidizing gas bypasses the exhaust air cooler 351. Specifically, the heater bypass line 468 corresponds to the start-up air heating line 455 that bypasses the oxidizing gas from the downstream side to the upstream side (inlet side of the SOFC 313) of the exhaust air cooler 351 in FIG. 4. In other words, the control unit 20 controls the control valve 457 of FIG. 4. The heater bypass line 468 is not limited to case where the start-up air heating line 455 of FIG. 4 is used as long as the heater bypass line 468 is line that bypasses the exhaust air cooler 351. By using the start-up air heating line 455 as the heater bypass line 468, the start-up air heating line 455 used for start-up can be diverted.

Specifically, in case where the ambient air temperature is high (in case where the ambient air temperature is equal to or higher than predetermined value), the control unit 20 controls the control valve 457 in opening direction, bypasses the exhaust air cooler 351, and increases the flow rate of the oxidizing gas supplied to the SOFC 313. In this case, the start-up heater 458 in FIG. 4 is not operating and is not heated. In this manner, in case where the ambient air temperature is high, a part (or all) of the oxidizing gas is bypassed to the exhaust air cooler 351, and thus, the temperature rise of the oxidizing gas supplied to the SOFC 313 can be more effectively suppressed.

As described above, according to the fuel cell system and the control method therefor according to the present embodiment, in case where the exhaust air cooler (heater) 351 that heats the oxidizing gas A2 of the oxidizing gas supply line 331 via the exhaust oxidizing gas A3 discharged from the SOFC 313 is provided. In case where the heater bypass line 468 that bypasses the heater is provided and the ambient air temperature is equal to or higher than the predetermined value, the control valve 457 of the heater bypass line 468 is controlled, and the flow rate of the oxidizing gas flowing through the heater bypass line 468 is increased. Accordingly, even in case where the ambient air temperature is high, the temperature rise of the oxidizing gas supplied to the SOFC 313 can be suppressed.

The present disclosure is not limited to the above-described embodiments, and can be appropriately modified without departing from the gist of the present invention. It is also possible to combine each embodiment. In other words, the above-described first embodiment, second embodiment, and third embodiment can also be combined with each other.

The fuel cell system and the control method therefor described in each of the above-described embodiments are understood as follows, for example.

Fuel cell system (310) according to the present disclosure includes: fuel cell (313) having cathode (113) and anode (109); a turbocharger (411) having a turbine (423) to which exhaust fuel gas and exhaust oxidizing gas discharged from the fuel cell (313) are supplied as combustion gas and having a compressor (421) driven by the turbine (423); oxidizing gas supply line (331) for supplying oxidizing gas compressed by the compressor (421) to the cathode (113); a heat exchanger (430) that heats the oxidizing gas in the oxidizing gas supply line (331) by exhaust gas discharged from the turbine (423) and that flows the exhaust gas to combustion exhaust gas line (329); bypass line (332, 444) having one end connected to upstream side of the heat exchanger (430) in the oxidizing gas supply line (331) and bypassing the oxidizing gas; a flow regulation valve (336, 445) provided on the bypass line (332, 444); and a control unit (20) that controls the flow regulation valve (336, 445) based on ambient air temperature to control bypass flow rate of the oxidizing gas.

According to the fuel cell system (310) according to the present disclosure, the exhaust oxidizing gas A3 and the exhaust fuel gas discharged from the fuel cell (313) are supplied to the turbine (423), and the compressor (421) for compressing the oxidizing gas is driven by the turbine (423). Then, the oxidizing gas compressed by the compressor (421) is heated by the exhaust gas discharged from the turbine (423) and is supplied to the fuel cell (313). In such a configuration, through diligent study the inventor has found that there is possibility that the operating state is destabilized by the ambient air temperature. Specifically, when the ambient air temperature is low, there is possibility that the flow rate of the exhaust gas (combustion gas) supplied to the turbine 423 increases and that the turbine is in choke state. When the ambient air temperature is high, there is possibility that the temperature of the exhaust gas (combustion gas) supplied to the turbine (423) rises and exceeds the inlet upper limit temperature.

Here, by providing the bypass line (332, 444) that bypasses the heat exchanger (430), and by controlling the flow regulation valve (336, 445) of the bypass line (332, 444) based on the ambient air temperature, it is possible to regulate the state of the oxidizing gas supplied to the fuel cell (313). Therefore, it is possible to further stabilize the operation in response to fluctuations in the ambient air temperature.

In the fuel cell system (310) according to the present disclosure, the other end of the bypass line (332, 444) may be connected to downstream side of the heat exchanger (430) in the combustion exhaust gas line (329), and the control unit (20) may control the flow regulation valve (336, 445) based on the ambient air temperature to regulate flow rate of the combustion gas supplied to the turbine (423).

According to the fuel cell system (310) according to the present disclosure, by controlling the flow regulation valve (336, 445) based on the ambient air temperature, the oxidizing gas of the oxidizing gas supply line (331) can be bypassed to the combustion exhaust gas line (329) and released to the atmosphere. In other words, it is possible to regulate the flow rate of the exhaust gas (combustion gas) supplied to the turbine (423). Accordingly, it is possible to suppress the choke state.

In the fuel cell system (310) according to the present disclosure, the control unit (20) may control the flow regulation valve (336) to increase flow rate of the oxidizing gas flowing through the bypass line (332) in case where the ambient air temperature is equal to or lower than predetermined value.

According to the fuel cell system (310) according to the present disclosure, in case where the ambient air temperature is low, there is possibility that the air density increases and that the mass flow rate of the exhaust gas supplied to the turbine (423) increases. However, in case where the ambient air temperature is equal to or lower than predetermined value, the flow regulation valve (336, 445) can be controlled to increase the flow rate of the oxidizing gas in the bypass line (332, 444). Accordingly, it is possible to regulate the mass flow rate of the exhaust gas supplied to the turbine (423) and to suppress the choke state.

In the fuel cell system (310) according to the present disclosure, the other end of the bypass line (444) may be connected to downstream side of the heat exchanger (430) in the oxidizing gas supply line (331), and the control unit (20) may control the flow regulation valve (445) based on the ambient air temperature to regulate temperature of the combustion gas supplied to the turbine (423).

According to the fuel cell system (310) according to the present disclosure, by controlling the flow regulation valve (336, 445) based on the ambient air temperature, the oxidizing gas can be bypassed to the heat exchanger (430) and flow. Therefore, even in case where the ambient air temperature is high, it is possible to suppress the case where the temperature of the exhaust gas supplied to the turbine (423) increases and exceeds, for example, the inlet upper limit temperature.

In the fuel cell system (310) according to the present disclosure, the control unit (20) may control the flow regulation valve (336, 445) to increase flow rate of the oxidizing gas in the bypass line (332, 444) in case where the ambient air temperature is equal to or higher than predetermined value.

According to the fuel cell system (310) according to the present disclosure, in case where the ambient air temperature is equal to or higher than predetermined value, by controlling the flow regulation valve (336, 445) to increase the flow rate of the oxidizing gas in the bypass line (332, 444), it is possible to suppress the case where the ambient air temperature increases and where the temperature of the exhaust gas supplied to the turbine (423) is raised.

In the fuel cell system (310) according to the present disclosure, warm-up line (464) connected to the bypass line (332, 444) and supplying the oxidizing gas to a casing (467) accommodating the compressor (421), may further be provided, and the control unit (20) may supply the oxidizing gas to the casing (467) via the warm-up line (464) in case where the ambient air temperature is equal to or lower than predetermined value.

According to the fuel cell system (310) according to the present disclosure, the casing (467) accommodating the compressor (421) is provided with the warm-up line (464) for supplying the oxidizing gas of the bypass line (332, 444), and in case where the ambient air temperature is equal to or lower than predetermined value, the oxidizing gas is supplied to the casing (467) via the warm-up line (464), and accordingly, it is possible to raise the temperature inside the casing (467), and to warm up at least a part of the compressor (421) and the air intake line (325) accommodated in the casing (467). By raising the atmospheric temperature and warming up at least a part of the compressor 421 and the air intake line 325, even in environment where the ambient air temperature is low, it is possible to stabilize the operation.

In the fuel cell system (310) according to the present disclosure, return line (465) connected to the bypass line (444) and supplying the oxidizing gas to intake port side of the oxidizing gas in the compressor (421), may further be provided, and the control unit (20) may supply the oxidizing gas to the intake port side of the compressor (421) via the return line (465) in case where the ambient air temperature is equal to or lower than predetermined value.

According to the fuel cell system (310) according to the present disclosure, the return line (465) for supplying the oxidizing gas is provided on the intake port side of the oxidizing gas in the compressor (421), and in case where the ambient air temperature is equal to or lower than predetermined value, the oxidizing gas is supplied to the intake port side of the compressor (421) via the return line (465), and accordingly, the temperature of the oxidizing gas compressed by the compressor (421) can be raised. Therefore, the operation can be stabilized even in case where the ambient air temperature is low.

In the fuel cell system (310) according to the present disclosure, a heater (351) that heats the oxidizing gas in the oxidizing gas supply line (331) with the exhaust oxidizing gas discharged from the fuel cell (313); a heater bypass line (468) having one end connected to upstream side of the heater (351) and the other end connected to downstream side of the heater (351) and bypassing the oxidizing gas, on the oxidizing gas supply line (331); and a control valve (457) provided on the heater bypass line (468), may further be provided, and the control unit (20) may control the control valve (457) to increase flow rate of the oxidizing gas in the heater bypass line (468) in case where the ambient air temperature is equal to or higher than predetermined value.

According to the fuel cell system (310) according to the present disclosure, in case where the heater (351) that heats the oxidizing gas of the oxidizing gas supply line (331) via the exhaust oxidizing gas (A3) discharged from the fuel cell (313) is provided. In case where the heater bypass line (468) that bypasses the heater (351) is provided and the ambient air temperature is equal to or higher than the predetermined value, the control valve (457) of the heater bypass line (468) is controlled, and the flow rate of the oxidizing gas in the heater bypass line (468) is increased. Accordingly, even in case where the ambient air temperature is high, the temperature rise of the oxidizing gas supplied to the fuel cell (313) can be suppressed. Accordingly, it is possible to suppress the case where the temperature of the exhaust gas supplied to the turbine (423) exceeds, for example, the inlet upper limit temperature.

Control method for fuel cell system (310) according to the present disclosure is control method for fuel cell system (310) including fuel cell (313) having cathode (113) and anode (109), a turbocharger (411) having a turbine (423) to which exhaust fuel gas and exhaust oxidizing gas discharged from the fuel cell (313) are supplied as combustion gas and having a compressor (421) driven by the turbine (423), oxidizing gas supply line (331) for supplying oxidizing gas compressed by the compressor (421) to the cathode (113), a heat exchanger (430) that heats the oxidizing gas in the oxidizing gas supply line (331) by exhaust gas discharged from the turbine (423) and that flows the exhaust gas to combustion exhaust gas line (329), bypass line (332, 444) having one end connected to upstream side of the heat exchanger (430) in the oxidizing gas supply line (331) and bypassing the oxidizing gas, and a flow regulation valve (336, 445) provided on the bypass line (332, 444), the method including: controlling the flow regulation valve (336, 445) based on ambient air temperature to control bypass flow rate of the oxidizing gas.

REFERENCE SIGNS LIST

11: CPU
12: ROM
13: RAM
14: hard disk drive
15: communication unit
18: bus
20: control unit
101: cell stack
103: substrate tube
105: fuel cell
107: interconnector
109: anode (fuel electrode)
111: solid electrolyte film
113: cathode (air electrode)
115: lead film
201: SOFC module
203: SOFC cartridge
205: pressure vessel
207: fuel gas supply pipe
207a: fuel gas supply branch pipe
209: fuel gas discharge pipe
209a: fuel gas discharge branch pipe
215: power generation chamber
217: fuel gas supply header
219: fuel gas discharge header
221: oxidizing gas supply header
223: oxidizing gas discharge header
225a: upper tube plate
225b: lower tube plate
227a: upper thermal insulation
227b: lower thermal insulation
229a: upper casing
229b: lower casing
231a: fuel gas supply hole
231b: fuel gas discharging hole
233a: oxidizing gas supply hole
233b: oxidizing gas discharging hole
235a: oxidizing gas supply gap
235b: oxidizing gas discharge gap
237a: seal member
237b: seal member
310: fuel cell system
313: SOFC (fuel cell)
325: air intake line
328: combustion gas supply line
329: combustion exhaust gas line (exhaust gas line)
331: oxidizing gas supply line
332: heat exchanger bypass line (bypass line)
333: exhaust oxidizing gas line
335: control valve
336: control valve (flow regulation valve)
341: fuel gas line
342: control valve
343: exhaust fuel gas line
346: shutoff valve
347: regulating valve
348: recycling blower
349: fuel gas recycling line
350: exhaust fuel gas release line
351: exhaust air cooler
352: control valve
361: purified water supply line
362: pump
363: temperature sensor
411: turbocharger
421: compressor
422: catalytic combustor
423: turbine
424: rotary shaft 430: heat exchanger
441: orifice
442: waste heat recovery equipment
443: control valve
444: oxidizing gas blow line (bypass line)
445: release valve (flow regulation valve)
451: control valve
452: blower
453: control valve
454: start-up air supply line
455: start-up air heating line
456: control valve
457: control valve
458: start-up heater
459: control valve
460: control valve
464: warm-up line
465: return line
467: casing
468: heater bypass line

The invention claimed is:

1. Fuel cell system comprising:
fuel cell having cathode and anode;
a turbocharger having a turbine to which exhaust fuel gas and exhaust oxidizing gas discharged from the fuel cell are supplied as combustion gas and having a compressor driven by the turbine;
oxidizing gas supply line for supplying oxidizing gas compressed by the compressor to the cathode;
a heat exchanger that heats the oxidizing gas in the oxidizing gas supply line by exhaust gas discharged from the turbine and that flows the exhaust gas to combustion exhaust gas line;
bypass line having one end connected to upstream side of the heat exchanger in the oxidizing gas supply line and bypassing the oxidizing gas;
a flow regulation valve provided on the bypass line; and
a control unit including a processor and a memory storing a program that is executed by the processor and that causes the processor to execute a function, wherein
the function includes control of the flow regulation valve based on ambient air temperature to control bypass flow rate of the oxidizing gas,
the other end of the bypass line is connected to downstream side of the heat exchanger in the combustion exhaust gas line, and
the function further includes control of the flow regulation valve based on the ambient air temperature to regulate flow rate of the combustion gas supplied to the turbine.

2. The fuel cell system according to claim 1, wherein the function further includes control of the flow regulation valve to increase flow rate of the oxidizing gas flowing through the bypass line in case where the ambient air temperature is equal to or lower than predetermined value.

3. The fuel cell system according to claim 1, wherein the other end of the bypass line is connected to downstream side of the heat exchanger in the oxidizing gas supply line instead of the downstream side of the heat exchanger in the combustion exhaust gas line, in case where the ambient air temperature is equal to or higher than predetermined value, and
the function further includes control of the flow regulation valve based on the ambient air temperature to regulate temperature of the combustion gas supplied to the turbine.

4. The fuel cell system according to claim 3, wherein the function further includes control of the flow regulation valve to increase flow rate of the oxidizing gas in the bypass line in case where the ambient air temperature is equal to or higher than the predetermined value.

5. The fuel cell system according to claim 1, further comprising:
warm-up line connected to the bypass line and supplying the oxidizing gas to a casing accommodating the compressor, wherein
the function further includes supply of the oxidizing gas to the casing via the warm-up line in case where the ambient air temperature is equal to or lower than predetermined value.

6. The fuel cell system according to claim 1, further comprising:
return line connected to the bypass line and supplying the oxidizing gas to intake port side of the oxidizing gas in the compressor, wherein
the function further includes supply of the oxidizing gas to the intake port side of the compressor via the return line in case where the ambient air temperature is equal to or lower than predetermined value.

7. The fuel cell system according to claim 1, further comprising:
a heater that heats the oxidizing gas in the oxidizing gas supply line with the exhaust oxidizing gas discharged from the fuel cell;
heater bypass line having one end connected to upstream side of the heater and the other end connected to downstream side of the heater and bypassing the oxidizing gas, on the oxidizing gas supply line; and
a control valve provided on the heater bypass line, wherein
the function further includes control of the control valve to increase flow rate of the oxidizing gas in the heater bypass line in case where the ambient air temperature is equal to or higher than predetermined value.

8. Control method for fuel cell system including fuel cell having cathode and anode, a turbocharger having a turbine to which exhaust fuel gas and exhaust oxidizing gas discharged from the fuel cell are supplied as combustion gas and having a compressor driven by the turbine, oxidizing gas supply line for supplying oxidizing gas compressed by the compressor to the cathode, a heat exchanger that heats the oxidizing gas in the oxidizing gas supply line by exhaust gas discharged from the turbine and that flows the exhaust gas to combustion exhaust gas line, bypass line having one end connected to upstream side of the heat exchanger in the oxidizing gas supply line and bypassing the oxidizing gas, and a flow regulation valve provided on the bypass line, the method comprising:
controlling the flow regulation valve based on ambient air temperature to control bypass flow rate of the oxidizing gas; and
controlling the flow regulation valve based on the ambient air temperature to regulate flow rate of the combustion gas supplied to the turbine, wherein
the other end of the bypass line is connected to downstream side of the heat exchanger in the combustion exhaust gas line.

* * * * *